US011332196B2

(12) United States Patent
Kiyoshita et al.

(10) Patent No.: US 11,332,196 B2
(45) Date of Patent: May 17, 2022

(54) REAR VEHICLE-BODY STRUCTURE OF VEHICLE

(71) Applicant: MAZDA MOTOR CORPORATION, Hiroshima (JP)

(72) Inventors: Daisuke Kiyoshita, Hiroshima (JP); Takeshi Nakamura, Hiroshima (JP); Naoto Mitsuishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 79 days.

(21) Appl. No.: 16/733,914

(22) Filed: Jan. 3, 2020

(65) Prior Publication Data

US 2020/0269930 A1  Aug. 27, 2020

(30) Foreign Application Priority Data

Feb. 27, 2019  (JP) .............................. JP2019-033447

(51) Int. Cl.
*B62D 25/08*  (2006.01)
*B62D 25/18*  (2006.01)
(Continued)

(52) U.S. Cl.
CPC ......... *B62D 25/088* (2013.01); *B62D 25/087* (2013.01); *B62D 23/00* (2013.01);
(Continued)

(58) Field of Classification Search
CPC ........ B62D 25/02; B62D 25/04; B62D 25/08; B62D 25/087; B62D 25/088; B62D 27/02; B62D 23/00; B62D 23/005
(Continued)

(56) References Cited

U.S. PATENT DOCUMENTS

| 6,619,729 B2 * | 9/2003 | Kimura .................. B60J 5/0477 296/203.01 |
| 2007/0138837 A1 * | 6/2007 | Tomioka ................ B62D 25/08 296/203.04 |

(Continued)

FOREIGN PATENT DOCUMENTS

| JP | 11034916 A | * 2/1999 |
| JP | H11-348826 A | 12/1999 |

(Continued)

OTHER PUBLICATIONS

Tominaga et al., "Car Body Structure", Feb. 9, 1999, Japanese Patent Office, Edition: JP11034916A (Year: 1999).*

(Continued)

*Primary Examiner* — Dennis H Pedder
*Assistant Examiner* — Joyce Eileen Hill
(74) *Attorney, Agent, or Firm* — Studebaker & Brackett PC

(57) ABSTRACT

A first loop-shaped structure section is provided on a forward side of and closely to a damper support section so as to have a loop shape in a vehicle elevational view. A second loop-shaped structure section is provided around a rear-gate opening portion so as to have a loop shape in the vehicle elevational view. A third loop-shaped structure section is provided to extend continuously along a lower side wall part interconnecting lower wall parts of the first and second loop-shaped structure sections, a side wall part of the first loop-shaped structure section, an upper side wall part interconnecting upper end portions of upper wall parts of the first and second loop-shaped structure sections, and a side wall part of the second loop-shaped structure section so as to have a loop shape in a vehicle side view.

10 Claims, 13 Drawing Sheets

(51) Int. Cl.
*B62D 25/04* (2006.01)
*B62D 23/00* (2006.01)

(52) U.S. Cl.
CPC ............ *B62D 23/005* (2013.01); *B62D 25/04* (2013.01); *B62D 25/18* (2013.01)

(58) Field of Classification Search
USPC .... 296/193.01, 193.02, 193.06, 193.08, 198, 296/203.01, 203.02, 203.04, 9.08, 195, 296/9.8
See application file for complete search history.

(56) References Cited

U.S. PATENT DOCUMENTS

| 2011/0156447 | A1* | 6/2011 | Matsuoka | B62D 25/088 296/203.04 |
| 2012/0205944 | A1* | 8/2012 | Kido | B62D 25/088 296/187.09 |
| 2013/0221708 | A1* | 8/2013 | Hanakawa | B62D 25/088 296/193.09 |
| 2013/0241240 | A1* | 9/2013 | Tokumoto | B62D 25/087 296/193.08 |
| 2015/0251708 | A1* | 9/2015 | Kim | B62D 23/005 296/203.01 |
| 2016/0185394 | A1* | 6/2016 | Sasaki | B62D 29/008 296/191 |
| 2016/0221610 | A1* | 8/2016 | Nishimura | B62D 25/02 |
| 2017/0197664 | A1* | 7/2017 | Yoshida | B62D 25/04 |
| 2018/0170434 | A1* | 6/2018 | Saito | B62D 25/088 |
| 2019/0039652 | A1 | 2/2019 | Kamei et al. | |

FOREIGN PATENT DOCUMENTS

| JP | 2007118736 A | * | 5/2007 | |
| JP | 2016-107789 A | | 6/2016 | |
| JP | 6128107 B | * | 5/2017 | ............ B62D 25/08 |

OTHER PUBLICATIONS

Daizo, "Vehicle Body Lower Part Frame Structure", Oct. 27, 2005, Japanese Patent Office, Edition: JP2007118736A (Year: 2005).*
Yoshitake, "Automotive Rear Body Structure", May 17, 2017, Japan Patent Office, JP6128107 (Year: 2017).*

* cited by examiner

REAR VEHICLE-BODY STRUCTURE OF VEHICLE

BACKGROUND OF THE INVENTION

The present invention relates to a rear vehicle-body structure of a vehicle in which a loop-shaped structure section which is configured to have a loop shape in a vehicle elevational (front) view is provided at a vehicle-body rear portion, wherein the loop-shaped structure section is formed by a closed-cross section portion and/or a thick plate portion having a thicker plate thickness than a vehicle-body panel.

Japanese Patent Laid-Open Publication No. 2016-107789 discloses a structure which exemplifies the above-described rear vehicle-body structure of the vehicle. That is, this disclosed structure is configured such that a damper support section for a rear suspension is provided at an upper part of a rear wheel house, a closed-cross section portion is formed by a floor panel and a floor cross member at a lower wall part of a vehicle body which extends in a vehicle width direction, a closed-cross section portion is formed by three members of a rear pillar inner, an inside rear pillar reinforcement, and an outside rear pillar reinforcement at each of right-and-left both side wall parts of the vehicle body which extends in a vertical direction, a closed-cross section portion is formed by a roof panel and a roof reinforcement at an upper wall part of the vehicle body which extends in the vehicle width direction, and the above-described closed-cross section portions are connected in a loop shape in the vehicle elevational view such that a loop-shaped structure section is provided at a vehicle-body rear portion, wherein the above-described inside rear pillar reinforcement interconnects the floor cross member arranged on a forward side, in a vehicle longitudinal direction, of the above-described damper support section of the rear pillar inner and the above-described outside rear pillar reinforcement arranged along a rear portion of a rear-door opening edge.

However, the above-described conventional structure disclosed in the patent document, in which the loop-shaped structure section having the loop shape in the vehicle elevational view is provided at the vehicle-body rear portion, may not be able to efficiently improve the rigidity of the vehicle-body rear portion because the inside rear pillar reinforcement is spaced forwardly, in the vehicle longitudinal direction, apart from the damper support section for the rear suspension. Therefore, there is room for improvement in improving the rigidity of the vehicle-body rear portion.

SUMMARY OF THE INVENTION

Accordingly, an object of the present invention is to provide a rear vehicle-body structure of a vehicle which can securely improve the vehicle-body rigidity of the vehicle rear portion.

The rear vehicle-body structure of the vehicle according to the present invention comprises a damper support section for a rear suspension provided at an upper part of a rear wheel house, a first loop-shaped structure section provided to extend continuously along a lower wall part, right-and-left both side wall parts, and an upper wall part of a vehicle body so as to have a loop shape in a vehicle elevational view, the first loop-shaped structure section being positioned on a forward side, in a vehicle longitudinal direction, of the damper support section and closely to the damper support section, a second loop-shaped structure section provided to extend continuously along a lower wall part, right-and-left both side wall parts, and an upper wall part of the vehicle body which are provided around a rear-gate opening portion so as to have a loop shape in the vehicle elevational view, and a third loop-shaped structure section provided to extend continuously along a lower side wall part of the vehicle body which interconnects respective end portions of the lower wall parts of the first and second loop-shaped structure sections, one of the right-and-left both side wall parts of the first loop-shaped structure section, an upper side wall part of the vehicle body which interconnects respective upper end portions of the upper wall parts of the first and second loop-shaped structure sections, and one of the right-and-left both side wall parts of the second loop-shaped structure section so as to have a loop shape in a vehicle side view, wherein each of the first, second, and third loop-shaped structure sections is formed by a closed-cross section portion where a closed-cross section is partitioned by plural members and/or a thick plate portion having a thicker plate thickness than a vehicle-body panel.

According to the present invention, since the first loop-shaped structure section positioned on the forward side, in the vehicle longitudinal direction, of and closely to the damper support section for the rear suspension and the second loop-shaped structure section provided around the rear-gate opening portion are connected by the third loop-shaped structure section configured to have the loop shape in the vehicle side view, the vehicle-body rigidity of the vehicle rear portion can be securely improved.

In an embodiment of the present invention, the first loop-shaped structure section comprises the vehicle-body lower wall part of a closed-cross section portion extending in a vehicle width direction which is formed by a floor panel and a floor cross member joined to the floor panel, each of the vehicle-body side wall parts of closed-cross section portions extending in a vehicle vertical direction which are formed by the rear wheel house and a first brace member and a pillar which are joined to the rear wheel house, and the vehicle-body upper wall part of a closed-cross section portion extending in the vehicle width direction which is formed by a roof panel and a roof reinforcement joined to the roof panel.

According to this embodiment, the first loop-shaped structure section can be formed without using any particularly-large special members additionally.

In another embodiment of the present invention, the second loop-shaped structure section comprises the vehicle-body lower wall part of a closed-cross section portion extending in a vehicle width direction which is formed by a rear end panel and a rear end cross member joined to the rear end panel, each of the vehicle-body side wall parts of a closed-cross section portion extending in a vehicle vertical direction which is formed by a rear pillar, and the vehicle-body upper wall part of a closed-cross section portion extending in the vehicle width direction which is formed by a roof panel and a rear header joined to the roof panel.

According to this embodiment, the second loop-shaped structure section can be formed without using any particularly-large special members additionally.

In another embodiment of the present invention, the third loop-shaped structure section comprises the vehicle-body lower wall part of a closed-cross section portion extending in the vehicle longitudinal direction which is formed by a rear side frame, the vehicle-body side wall part of closed-cross section portions extending in a vehicle vertical direction which are formed by the rear wheel house and a first brace member and a pillar which are joined to the rear wheel house, the vehicle-body upper wall part of a closed-cross section portion extending in the vehicle longitudinal direction which is formed by a roof side rail, and the vehicle-body side wall part of a closed-cross section portion extending in the vehicle vertical direction which is formed by a rear pillar.

According to this embodiment, the third loop-shaped structure section can be formed without using any particularly-large special members additionally.

In another embodiment of the present invention, the rear vehicle-body structure of the vehicle further comprises a fourth loop-shaped structure section provided to extend continuously along a lower wall part, right-and-left both side wall parts, and an upper wall part of the vehicle body so as to have a loop shape in a vehicle elevational view, the fourth loop-shaped structure section being positioned on a rearward side, in the vehicle longitudinal direction, of the damper support section for the rear suspension and closely to the damper support section, wherein the fourth loop-shaped structure section comprises the vehicle-body lower wall part extending in the vehicle width direction which is formed by a floor panel and a second floor cross member joined to the floor panel, each of the vehicle-body side wall parts extending in a vehicle vertical direction which is formed by the rear wheel house and a side panel and a second brace member which is joined to the rear wheel house and the side panel, and the vehicle-body upper wall part extending in the vehicle width direction which is formed by a roof panel and a rear header joined to the roof panel, and the fourth loop-shaped structure section is formed by a closed-cross section portion where a closed-cross section is partitioned by plural members and/or a thick plate portion having a thicker plate thickness than the vehicle-body panel.

According to this embodiment, since the first loop-shaped structure section and the fourth loop-shaped structure section are respectively positioned on the forward side of and closely to the damper support section for the rear suspension and on the rearward side of and closely to the damper support section for the rear suspension, the vehicle-body rigidity of the vehicle rear portion can be securely improved.

In another embodiment of the present invention, respective upper ends of the first and second loop-shaped structure sections are interconnected via a roof side rail in the vehicle longitudinal direction, and respective lower ends of the first and second loop-shaped structure sections are interconnected via a closed-cross section portion including a rear side frame and a rear-bumper-reinforcement attachment reinforcing member connecting a rear end of the rear side frame and the vehicle-body lower wall part of the second loop-shaped structure section.

According to this embodiment, since the rear end of the rear side frame and the vehicle-body lower wall part of the second loop-shaped structure section are connected by the rear-bumper-reinforcement attachment reinforcing member, the rigidity of the rear-gate opening portion can be further improved. Further, a part of the third loop-shaped structure section can be reinforced by the rear-bumper-reinforcement attachment reinforcing member. Moreover, the respective upper ends or the respective lower ends of the first and second loop-shaped structure sections are connected by using the roof side rail or the rear side frame which are generally provided at the vehicle body.

In another embodiment of the present invention, the damper support section for the rear suspension is provided at a rear side frame, and a damper-support reinforcing member for the rear suspension to reinforce the damper support section is joined to a floor portion of an upper surface of the rear side frame.

According to this embodiment, there is the following effect. That is, if the damper support section is provided at the upper part of the wheel house which is upwardly-and-outwardly, in the vehicle width direction, offset from the rear side frame, when a load is inputted in a vehicle rear collision or in a vehicle side collision, there occurs some moment acting on the damper support section. However, since the damper support section is provided at the rear side frame itself in this embodiment, it is suppressed that the above-described moment occurs, so that the collision-load inputting can be minimized.

In another embodiment of the present invention, respective lower ends of the first and fourth loop-shaped structure sections are interconnected in the vehicle longitudinal direction via a damper-support reinforcing member for the rear suspension.

According to this embodiment, a lower portion of the first loop-shaped structure section and a lower portion of the fourth loop-shaped structure section are connected by using the damper-support reinforcing member for the rear suspension, and also a part of the vehicle body positioned between the lower portion of the first loop-shaped structure section and the lower portion of the fourth loop-shaped structure section can be reinforced by this damper-support reinforcing member. Accordingly, the vehicle-body rigidity of the vehicle rear portion can be further securely improved.

In another embodiment of the present invention, the rear vehicle-body structure of the vehicle further comprises a damper support section for a front suspension provided at an upper part of a front wheel house, a fifth loop-shaped structure section provided in a vicinity of the damper support section for the front suspension so as to have a loop shape in the vehicle elevational view, the fifth loop-shaped structure section being formed by closed-cross sections including a front-suspension tower portion, a sub frame, and a cowl cross member, and a sixth loop-shaped structure section provided around a door opening portion so as to have a loop shape in a vehicle side view, the sixth loop-shaped structure section being formed by closed-cross sections provided around the door opening portion, wherein a rear portion of the sixth loop-shaped structure section is connected to the third loop-shaped structure section via a roof side rail at an upper portion thereof and connected to said third loop-shaped structure section via a rear side frame at a lower portion thereof.

According to this embodiment, since the rear portion of the sixth loop-shaped structure section is connected to the third loop-shaped structure section via the roof side rail and the rear side frame and the fifth loop-shaped structure section is provided in the vicinity of the damper support section for the front suspension, the torsional rigidity of a whole part of the vehicle body is so improved that the vehicle's handling stability can be secured.

The present invention will become apparent from the following description which refers to the accompanying drawings.

DETAILED DESCRIPTION OF THE INVENTION

Figure 1:
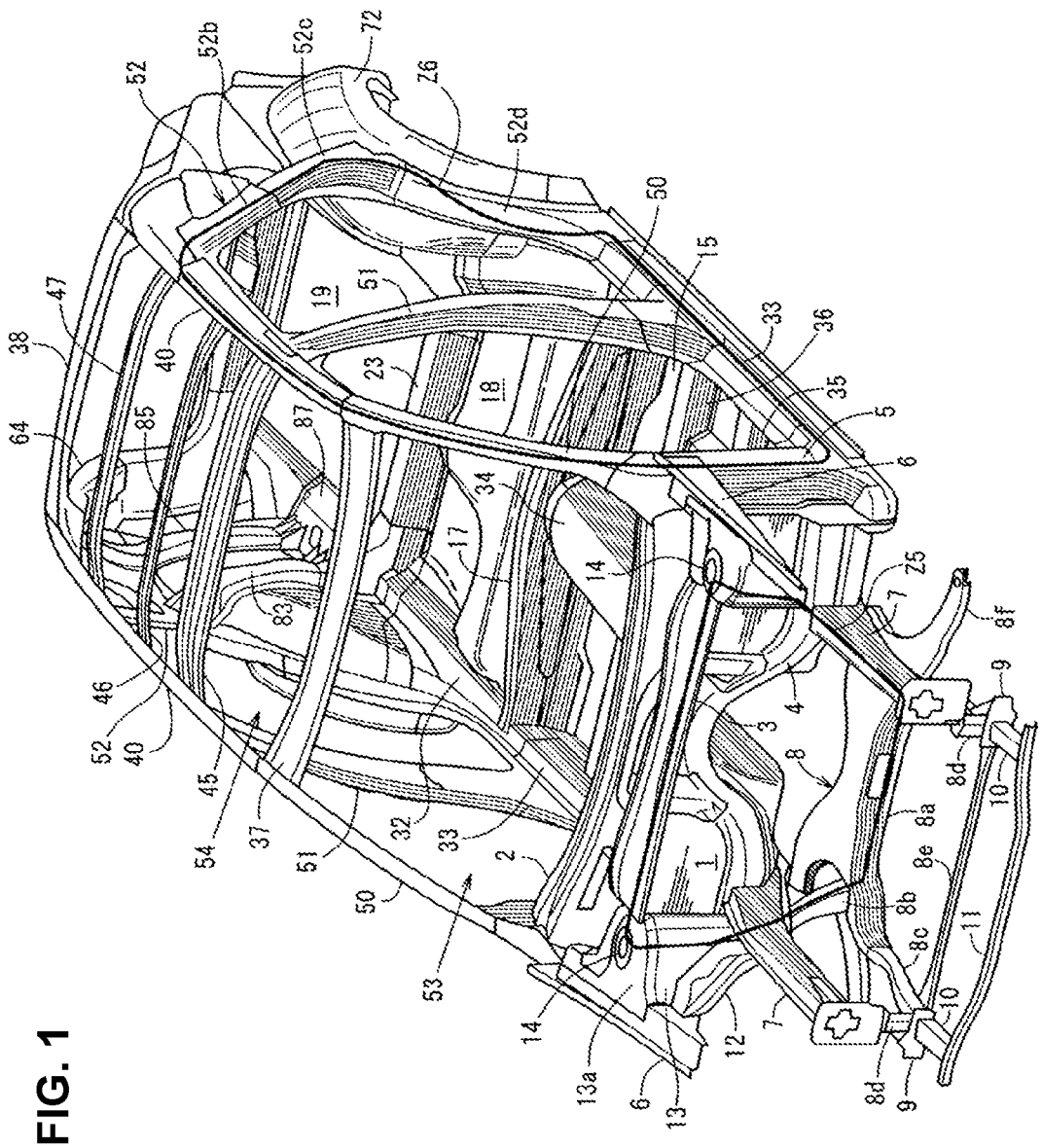
FIG. 1 is a perspective view of a vehicle-body structure of a whole part of a vehicle including a rear vehicle-body structure of the vehicle according to the present invention.

Hereafter, an embodiment of the present invention will be described referring to the drawings. The drawings show a rear vehicle-body structure of a vehicle, and FIG. 1 is a perspective view of a vehicle-body structure of a whole part of the vehicle including the rear vehicle-body structure of the vehicle. A front vehicle-body structure of the vehicle will be described referring to FIG. 1 first before describing the rear vehicle-body structure.

As show in FIG. 1, a dash panel 1 which partitions, in a vehicle longitudinal direction, a cabin and an engine room is provided, a cowl upper panel 2 is provided at an upper part of the dash panel 1, and a cowl cross member upper 3 which interconnects a pair of right-and-left suspension tower portions, which will be described later, in a vehicle width direction is provided in front of the cowl upper panel 2, whereby a closed-cross section portion extending in the vehicle width direction is formed between the cowl cross member upper 3 and a cowl cross member lower which is joined to the cowl cross member upper 3 from below. A dash cross member 4 is fixedly joined to a front side of a lower part of the dash panel 1, whereby a closed-cross section portion extending in the vehicle width direction is formed between the dash panel 1 and the dash cross member 4 as well.

A hinge pillar 5 which is formed by a hinge pillar inner and a hinge pillar outer which are fixedly joined together and has a hinge-pillar closed-cross section portion extending in a vertical direction of the vehicle is provided at each of right-and-left both sides of the dash panel 1. There is provided an apron 6 which extends forwardly from an upper part of the hinge pillar 5. This apron 6 is formed by an apron outer and an apron inner which are fixedly joined together, whereby an apron closed-cross section portion extending in the vehicle longitudinal direction is formed.

There is provided a pair of front side frames 7 which extend forwardly from respective lower parts of right-and-left both sides of the dash panel 1. Each of the front side frames 7 is formed by a front side frame inner and a front side frame outer which are fixedly joined together, whereby a front side closed-cross section portion extending in the vehicle longitudinal direction is formed.

A front sub frame 8 to support front-suspension arms is provided below the front side frames 7. The front sub frame 8 comprises a sub frame body 8a which has a closed-cross section structure extending in the vehicle width direction, a pair of tower portions 8b which respectively have a closed-cross section structure and connect the sub frame body 8a and the respective front side frames 7, a pair of side members 8c which respectively extend forwardly from respective side portions of the sub frame body 8a, a pair of vehicle-body attaching members 8d which connect the pair of side members 8c and the pair of front side frames 7, and a front cross member 8e which interconnects respective front end portions of the pair of side members 8c.

Further, a crash can 10 is attached to a front end of each of the pair of side members 8c via a set plate and an attaching plate 9, and a lower bumper beam 11 is provided to extend in the vehicle width direction between a pair of right-and-left crash cans 10.

Moreover, a front wheel house 12 and a suspension tower portion 13 are provided between the apron 6 and the front side frame 7, the suspension tower portion 13 includes a top deck portion 13a and is formed by a thick plate portion which has a thicker plate thickness than a vehicle-body panel, and a damper support section 14 for a front suspension is formed at a nearly central part of the top deck portion 13a. That is, the damper support section 14 for the front suspension is provided at an upper part of the front wheel house 12.

Figure 2:
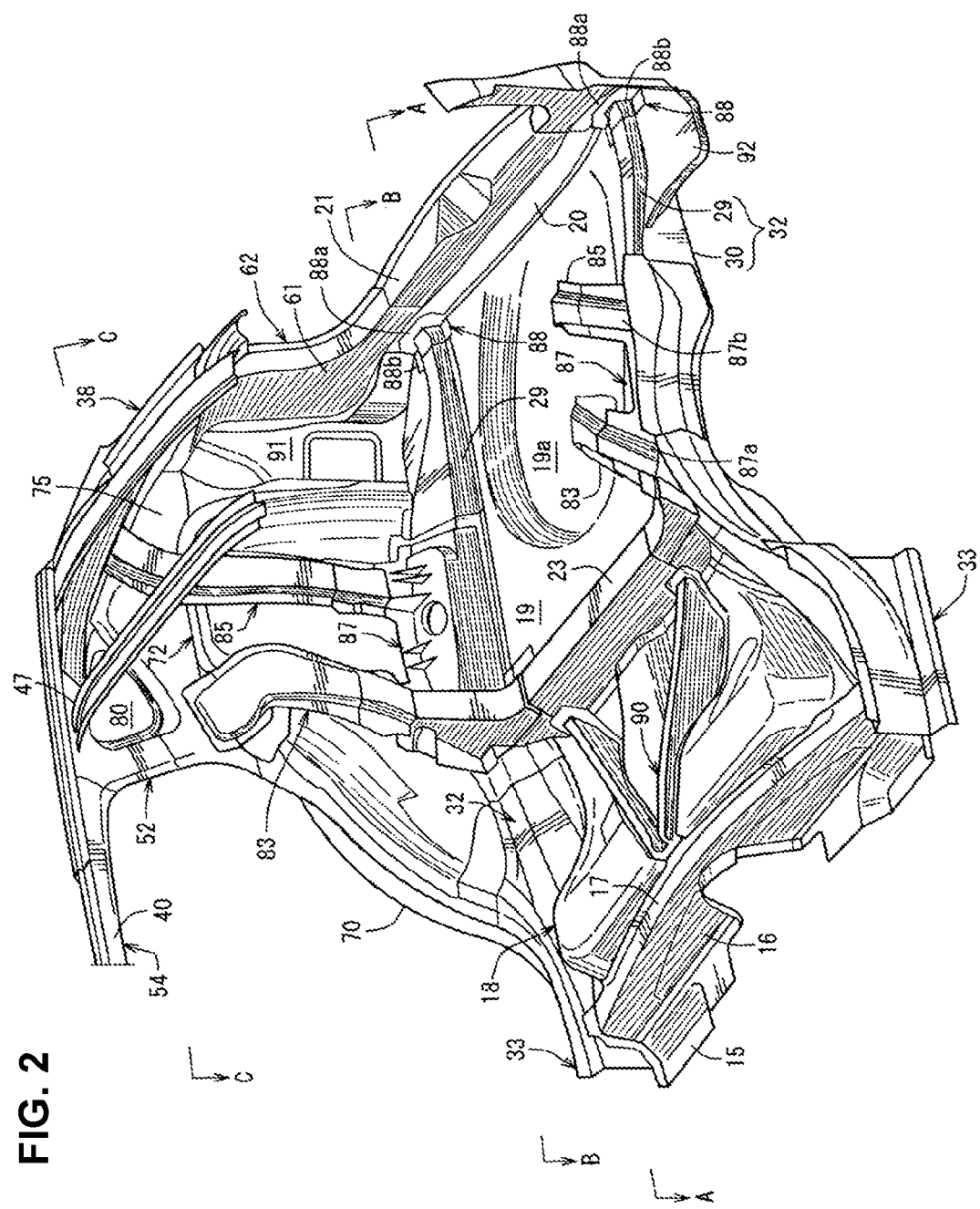
FIG. 2 is a perspective view of the rear vehicle-body structure of the vehicle.
Figure 3:
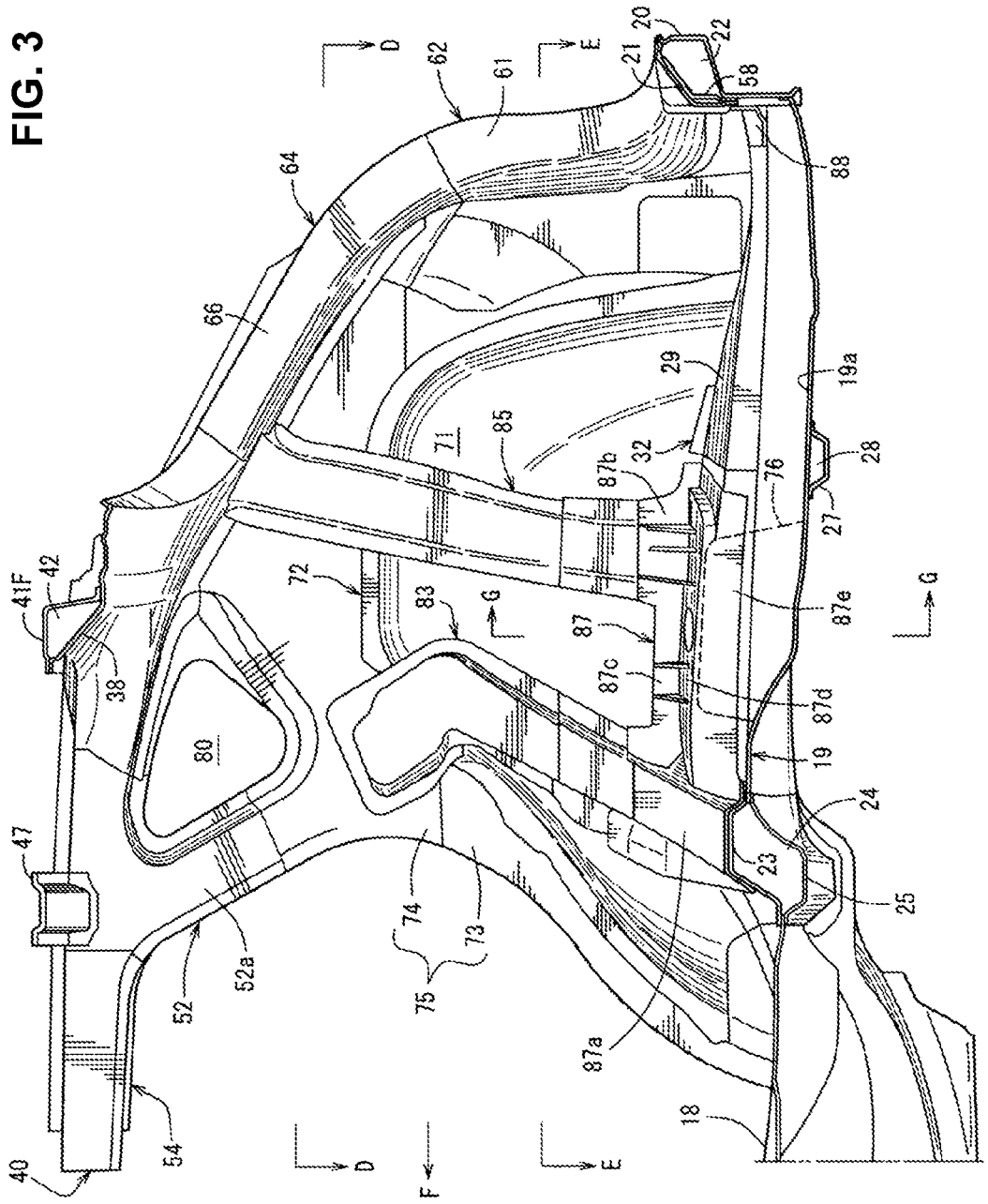
FIG. 3 is a side view of the rear vehicle-body structure of the vehicle, when viewed from an inside of a baggage room.
Figure 4:
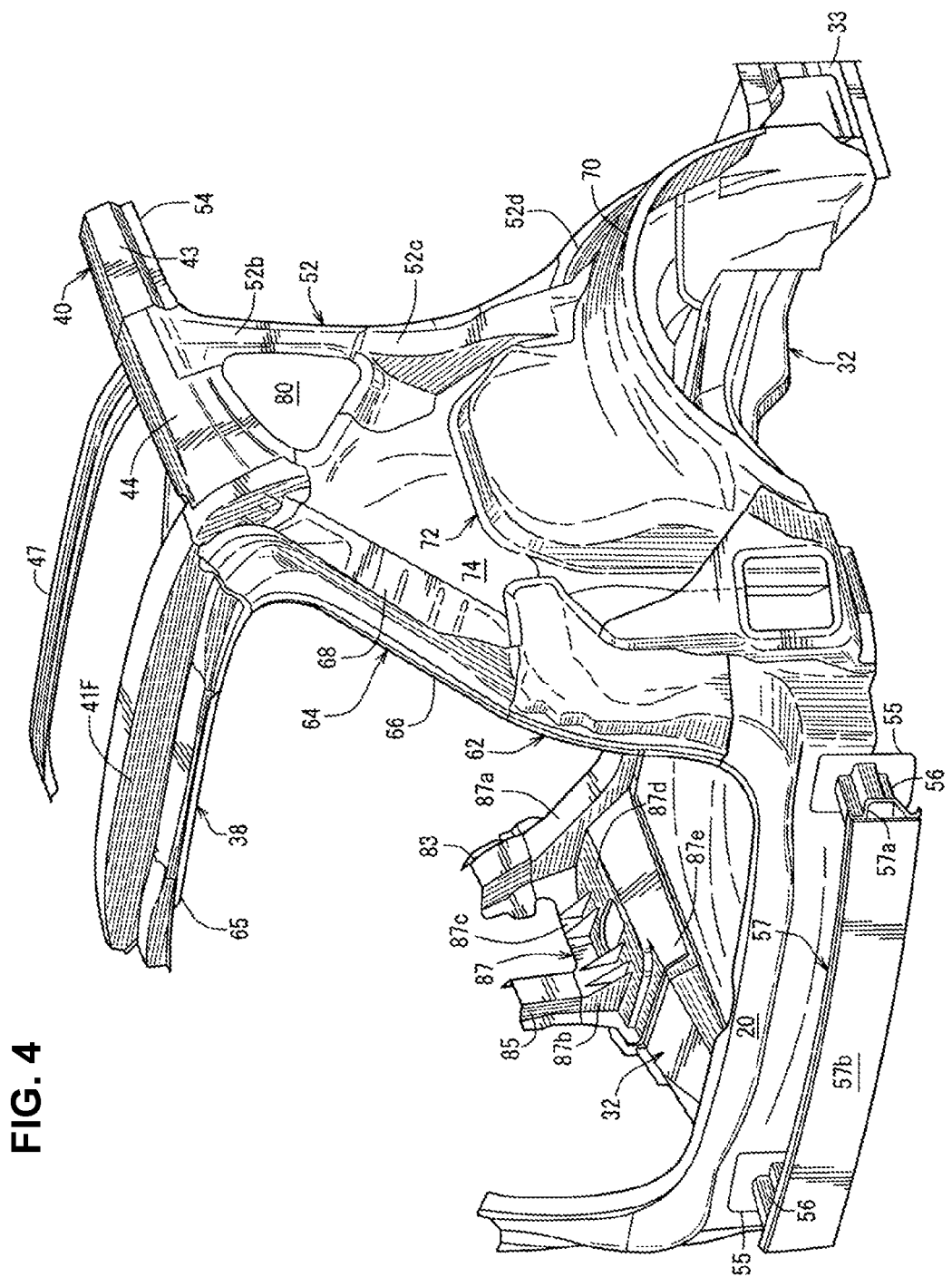
FIG. 4 is a perspective view of the rear vehicle-body structure of the vehicle, when viewed from a vehicle rearward side.
Figure 5:
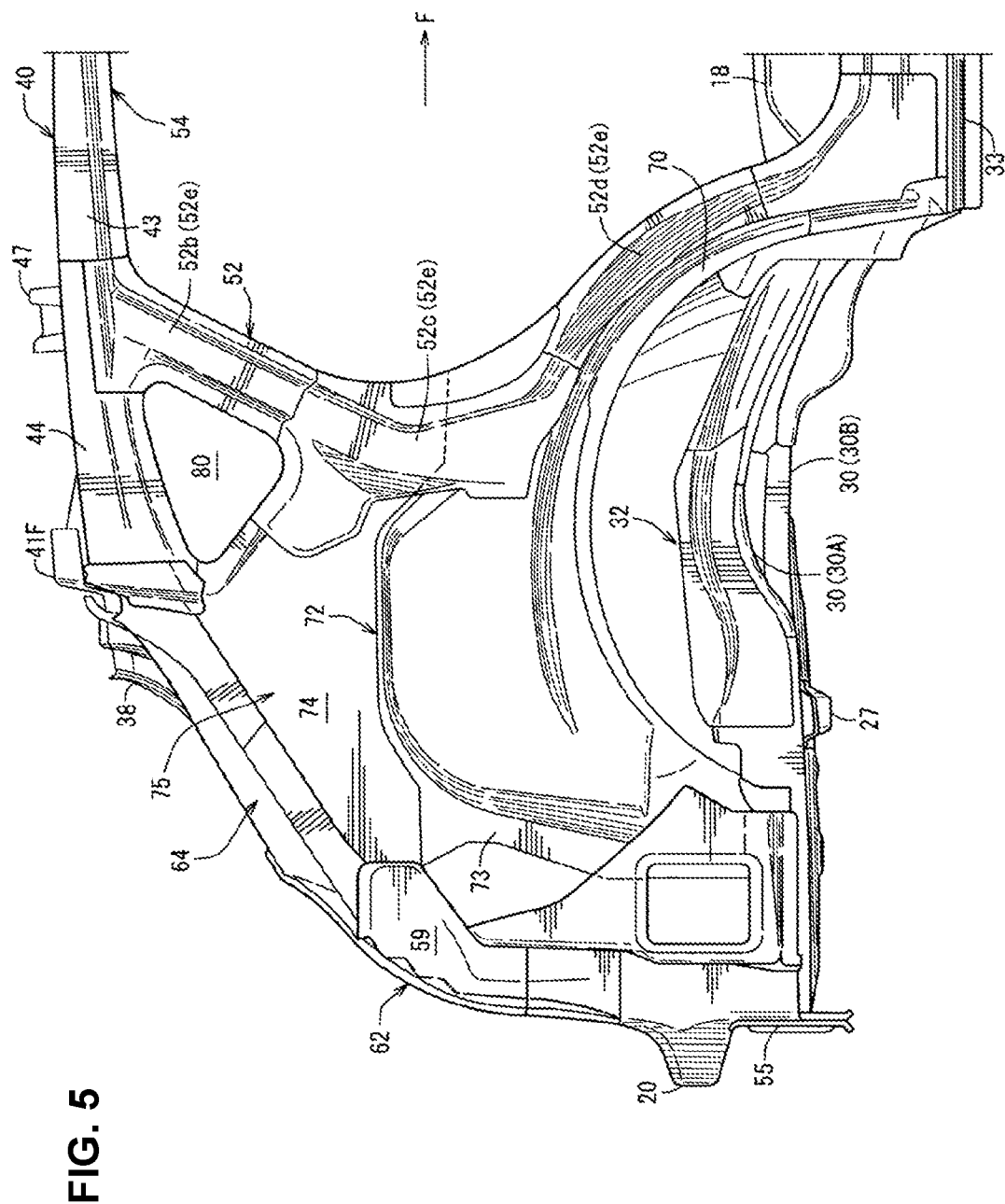
FIG. 5 is a side view of the right-side rear vehicle-body structure of the vehicle in which a vehicle-body outer panel is detached, when viewed from a vehicle outside.
Figure 6:
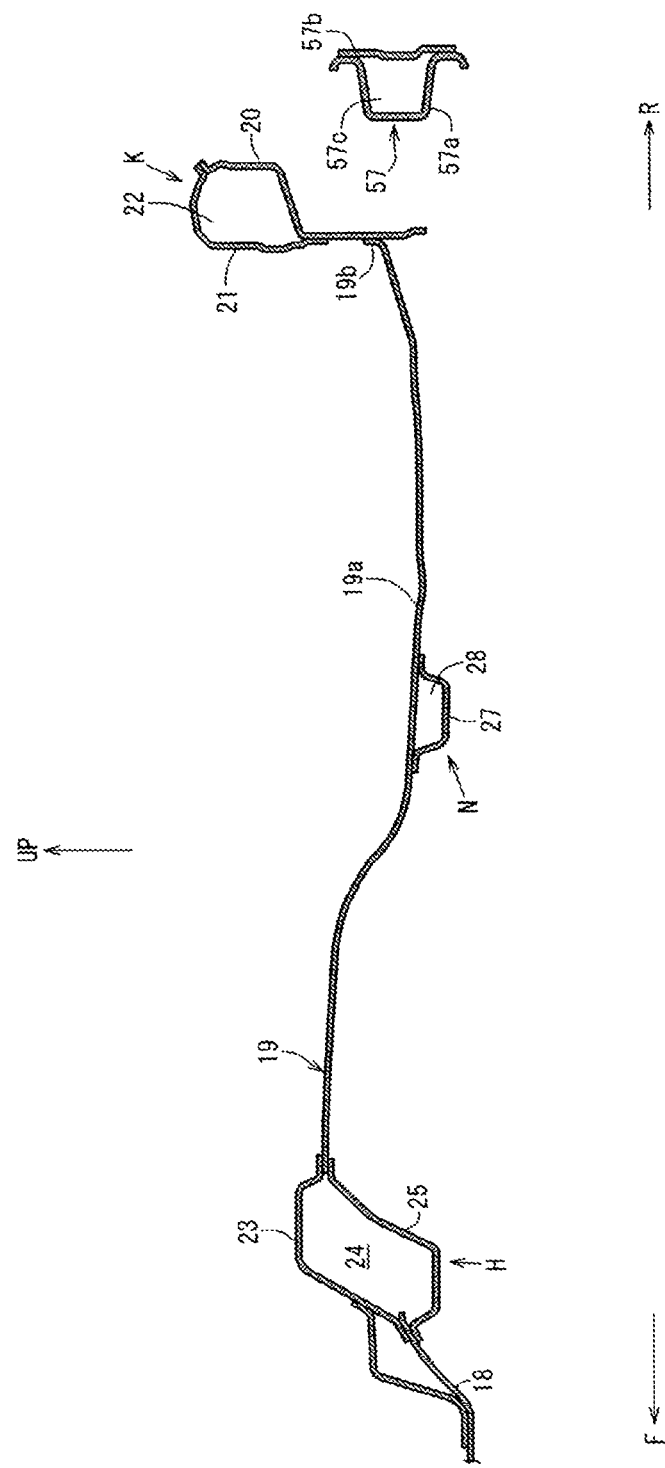
FIG. 6 is a sectional view of a major part taken along line A-A of FIG. 2.
Figure 7:
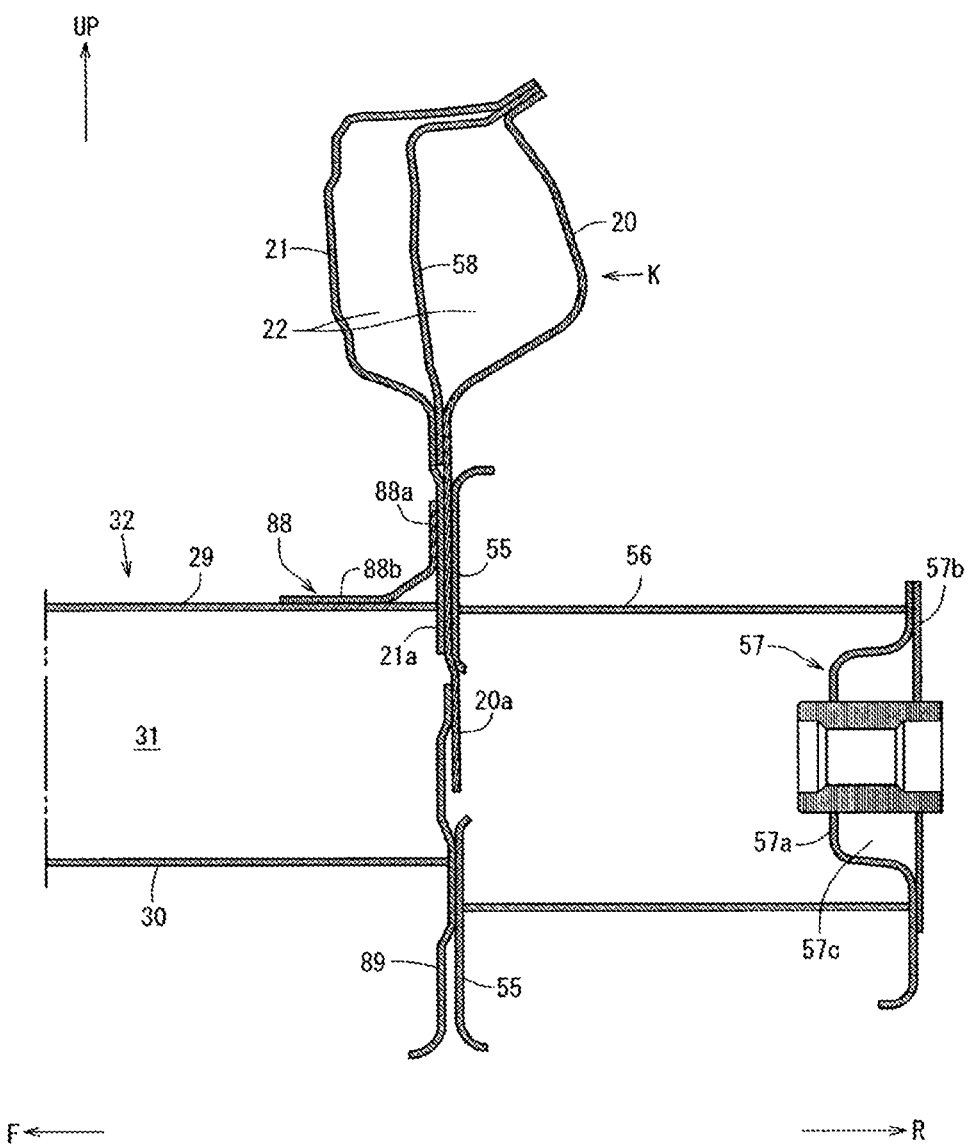
FIG. 7 is a sectional view of the major part taken along line B-B of FIG. 2.
Figure 8:
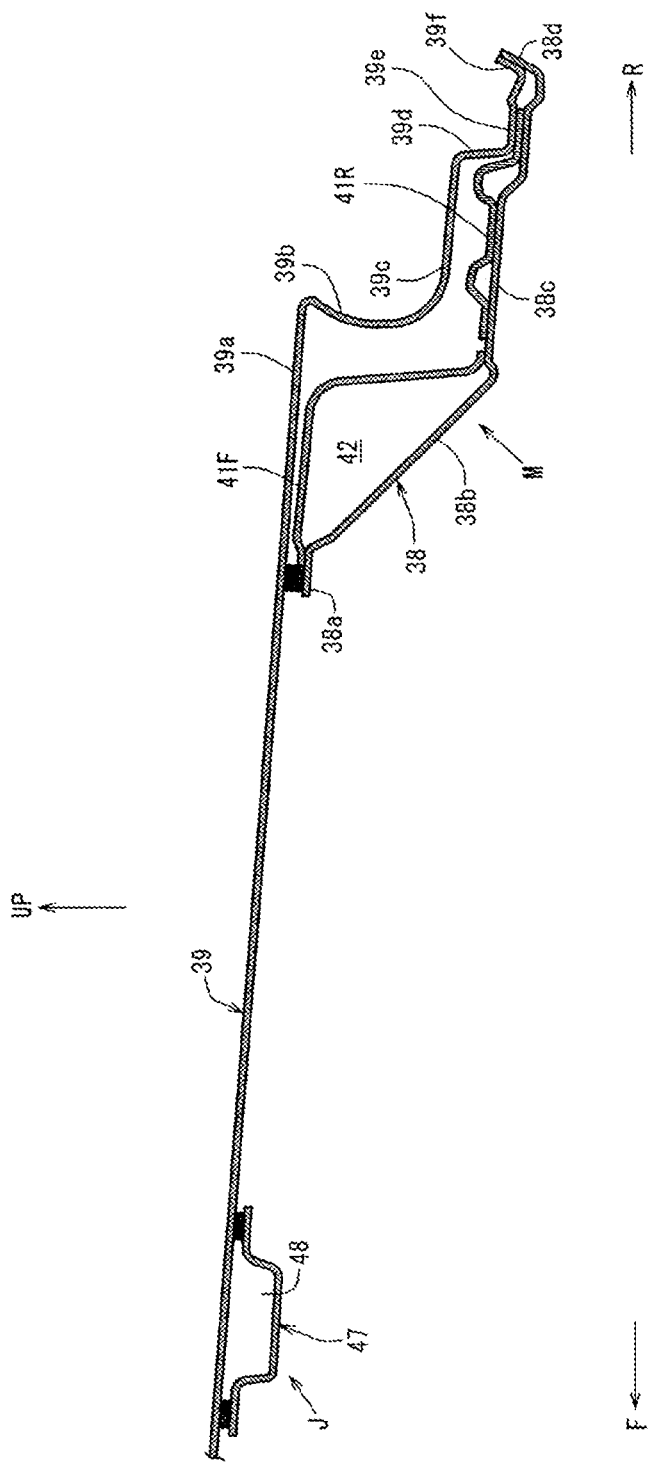
FIG. 8 is a sectional view of the major part taken along line C-C of FIG. 2.
Figure 9:
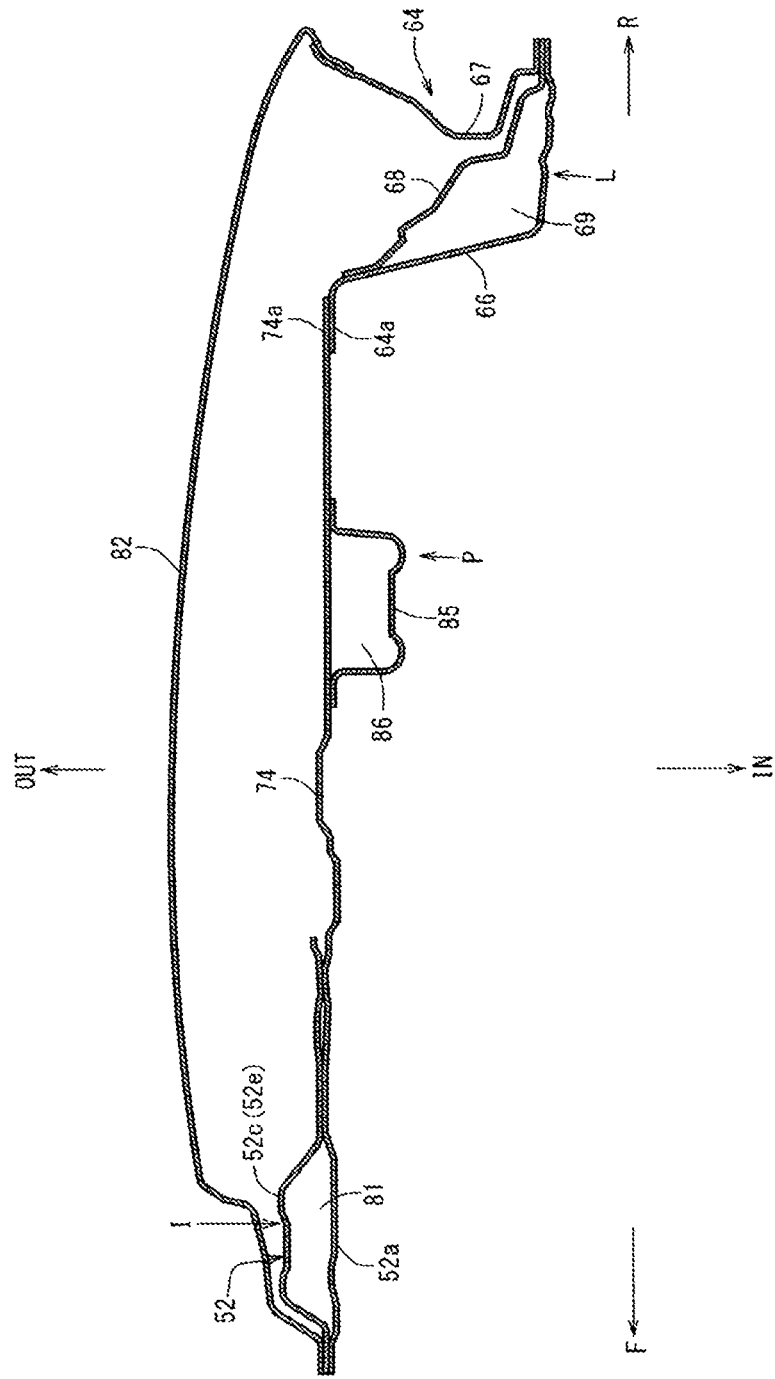
FIG. 9 is a sectional view taken along line D-D of FIG. 3.
Figure 10:
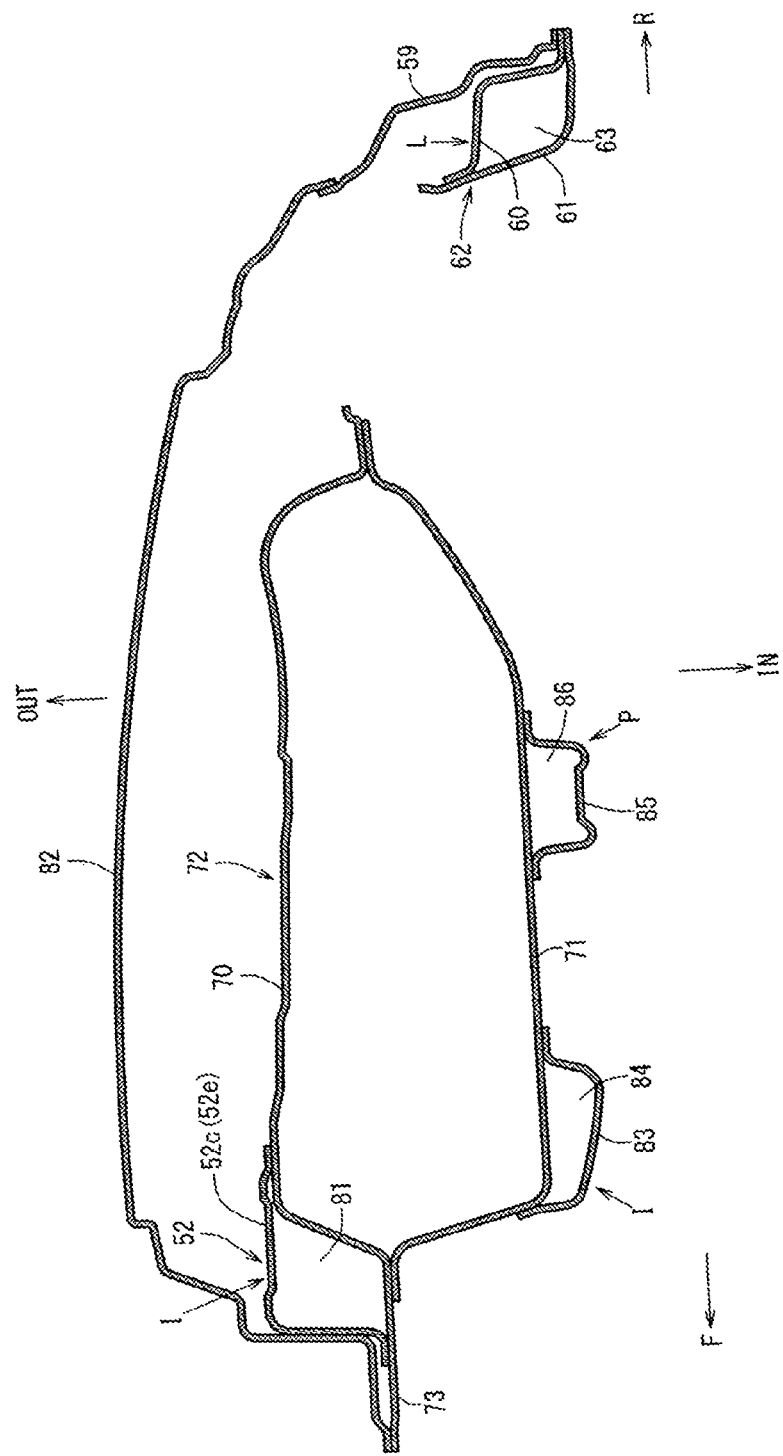
FIG. 10 is a sectional view taken along line E-E of FIG. 3.
Figure 11:
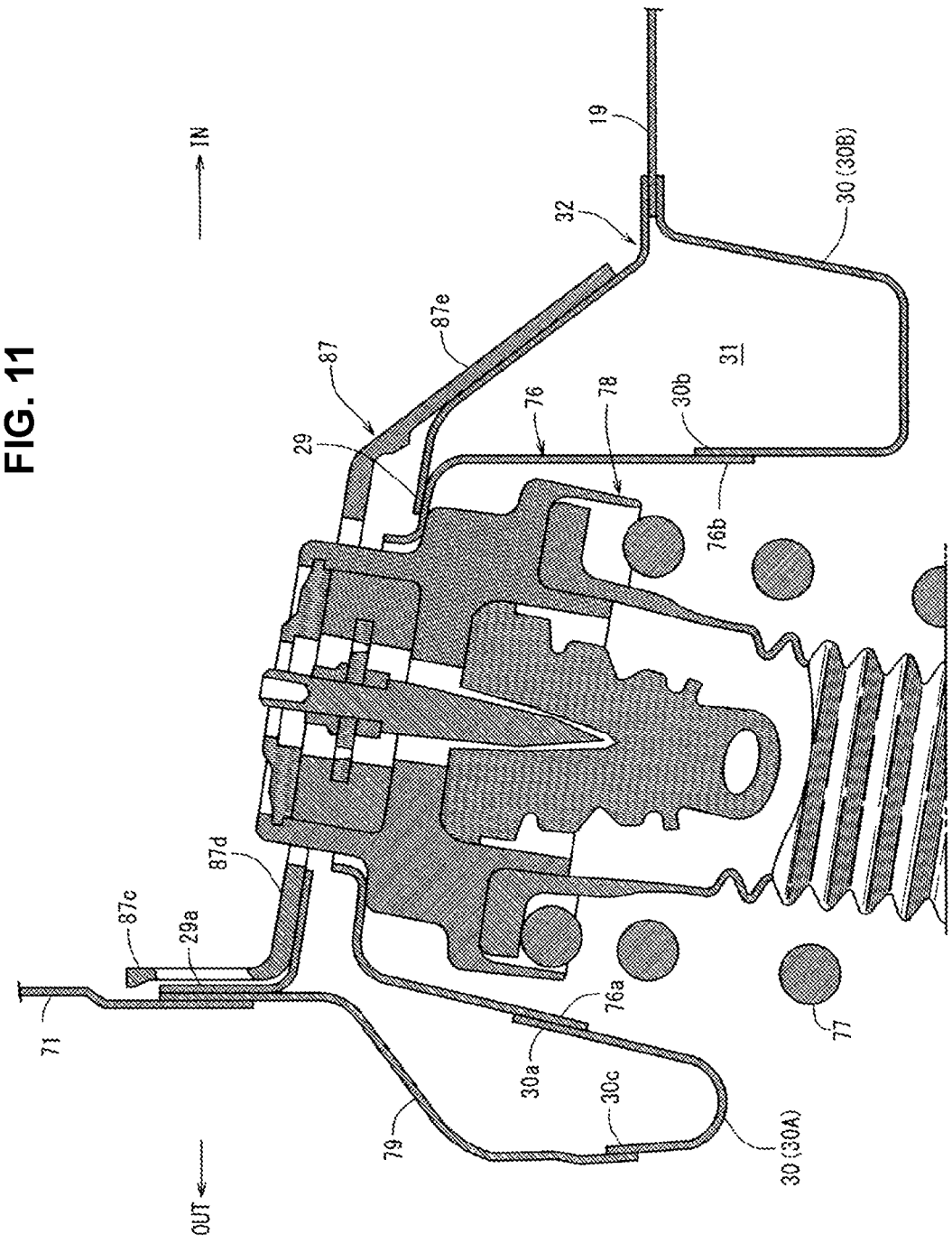
FIG. 11 is a sectional view taken along line G-G of FIG. 3.
Figure 12:
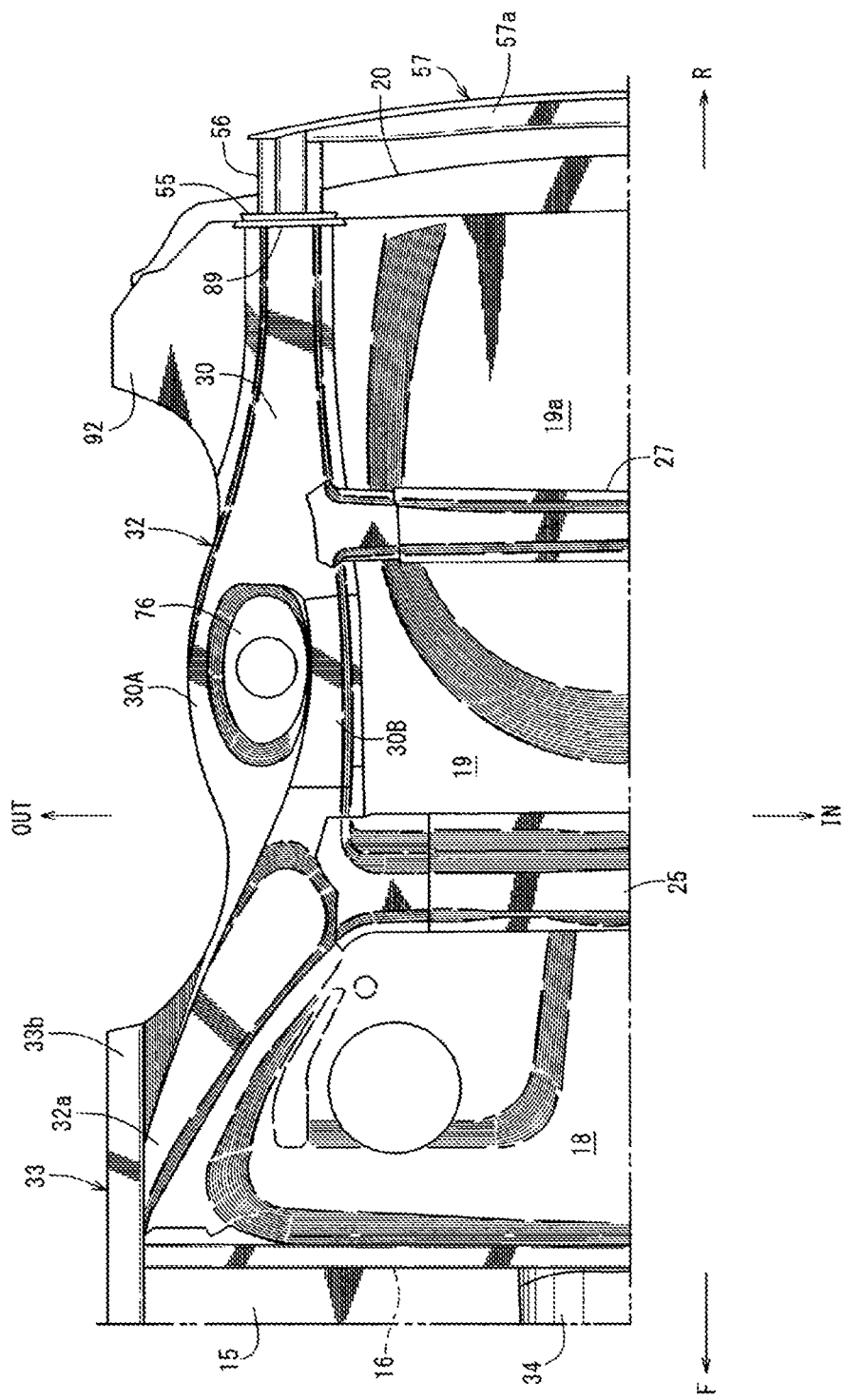
FIG. 12 is a partial bottom view of the rear vehicle-body structure of the vehicle.
Figure 13:
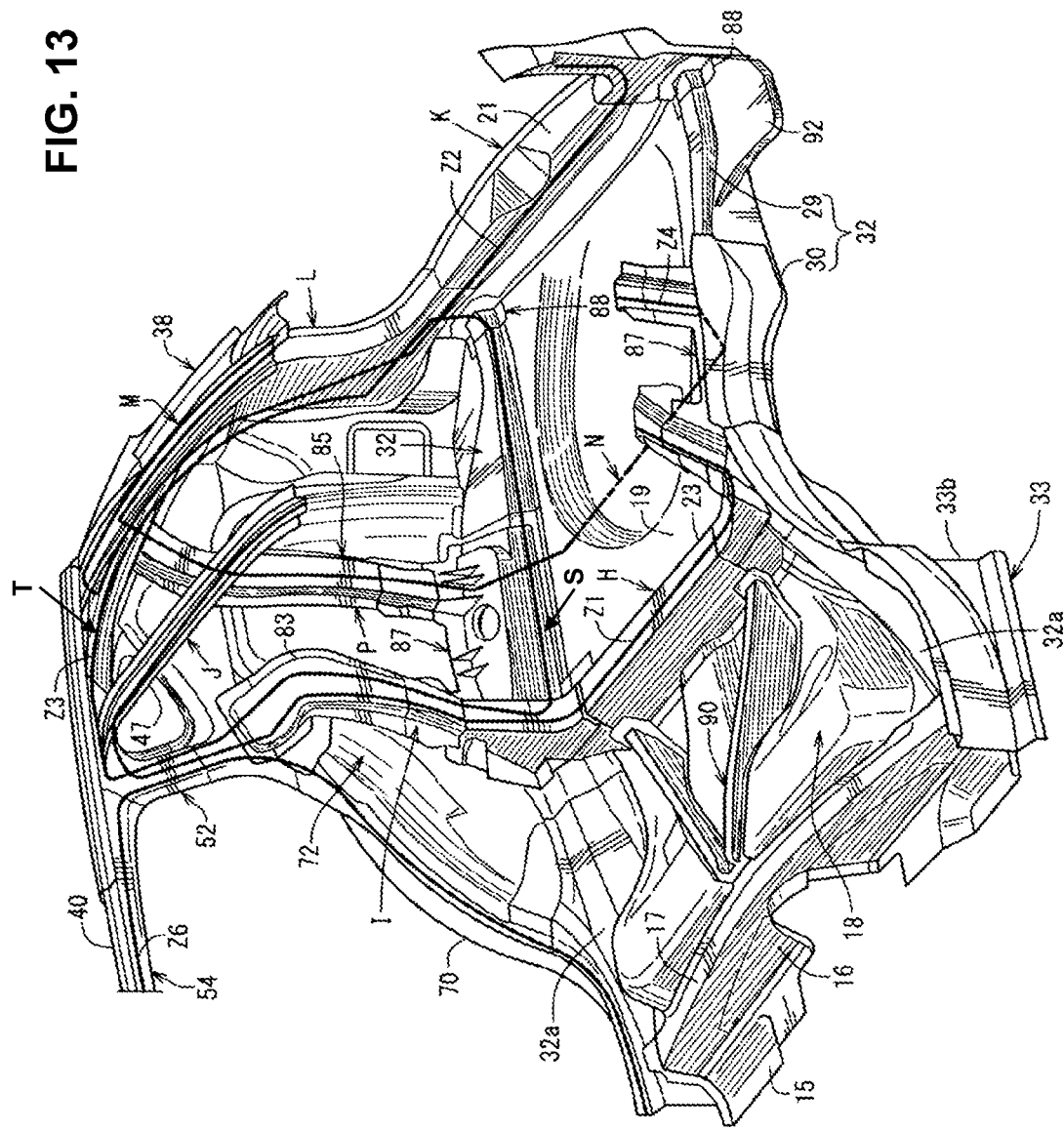
FIG. 13 is a perspective view of respective loop-shaped structure sections.

FIG. 2 is a perspective view of the rear vehicle-body structure of the vehicle, FIG. 3 is a side view of the rear vehicle-body structure of the vehicle, when viewed from an inside of a baggage room, FIG. 4 is a perspective view of the rear vehicle-body structure of the vehicle, when viewed from a vehicle rearward side, FIG. 5 is a side view of the right-side rear vehicle-body structure of the vehicle in which a vehicle-body outer panel is detached, when viewed from a vehicle outside, FIG. 6 is a sectional view of a major part taken along line A-A of FIG. 2, FIG. 7 is a sectional view of the major part taken along line B-B of FIG. 2, FIG. 8 is a sectional view of the major part taken along line C-C of FIG. 2, FIG. 9 is a sectional view taken along line D-D of FIG. 3, FIG. 10 is a sectional view taken along line E-E of FIG. 3, FIG. 11 is a sectional view taken along line G-G of FIG. 3, FIG. 12 is a partial bottom view of the rear vehicle-body structure of the vehicle, and FIG. 13 is a perspective view of respective loop-shaped structure sections.

Next, the rear vehicle-body structure of the vehicle will be described specifically referring to the respective figures. As shown in FIG. 2, a front floor panel 15 which forms a floor surface of the cabin is integrally provided at a rear end of a lower part of the dash panel 1 (herein, a part of a rear-side portion of the front floor panel 15 is illustrated only in FIG. 2) and a kick-up portion 16 which rises upwardly is provided at a rear end of the front floor panel 15. This kick-up portion 16 rising upwardly from the rear end of the front floor panel 15 extends rearwardly from an upper end of its rising portion, and a cross member 17 (a so-called No. 3 cross member) is attached onto the kick-up portion 16 such that a closed-cross section portion extending in the vehicle width direction is formed between the cross member 17 and the kick-up portion 16.

As shown in FIGS. 2, 3 and 6, a rear seat pan 18 and a rear floor pan 19 are integrally provided at a rear portion of the cross member 17 as shown in FIGS. 2, 3 and 6. The rear seat pan 18 is a part of a rear floor on which a rear seat is placed. The rear floor pan 19 is a part of the rear floor which forms the floor surface of the cabin, and a baggage-room recess portion 19a is formed at a middle part of the rear floor pan 19.

As shown in FIG. 6, a rear end panel 20 is fixedly joined to a rear-end bent portion 19b of the rear floor pan 19, and a rear end cross member 21 extending in the vehicle width direction is fixedly joined to a front side of an upper part of the rear end panel 20 such that a closed-cross section 22 extending in the vehicle width direction is formed between the rear end panel 20 and the rear end cross member 21.

As shown in FIGS. 3 and 6, a cross member upper 23 (a so-called No. 4 cross member upper) having a hat-shaped cross section is fixedly joined to an upper face of a portion between a rear portion of the rear seat pan 18 and a front portion of the rear floor pan 19. Likewise, a cross member lower 25 (a so-called No. 4 cross member lower) having an inverse hat-shaped cross section is fixedly joined to a lower face of the portion between the rear portion of the rear seat pan 18 and the front portion of the rear floor pan 19, whereby a closed-cross section portion 24 extending in the vehicle width direction is formed between the cross member upper 23 and the cross member lower 25.

Further, as shown in FIGS. 3 and 6, a rear cross member 27 (a so-called No. 4. 5 cross member) having an inverse hat-shaped cross section and extending in the vehicle width direction is fixedly joined to a lower surface of a middle part, in the longitudinal direction, of the rear floor pan 19 such that a closed-cross section portion 28 extending in the vehicle width direction is formed between the rear cross member 27 and the rear floor pan 19.

As shown in FIG. 2, a rear side frame upper 29 and a rear side frame lower 30 are fixedly joined to each of end portions, in the vehicle width direction, of the rear seat pan 18 and the rear floor pan 19 such that there is provided a rear side frame 32 which has a rear-side closed-cross section portion 31 (see FIG. 11) extending in the vehicle longitudinal direction. Herein, the cross member 17, the cross member upper 23, the cross member lower 25, and the rear cross member 27 are provided to extend in the vehicle width direction between the right-and-left rear side frames 32, 32.

As shown in FIGS. 1 and 12, a front end portion 32a of the rear side frame 32 is provided to overlap a rear end portion 33b of each of a pair of side sills 33 which are provided at right-and-left both sides of the front floor panel 15. The side sill 33 is a vehicle-body reinforcing member having a side-sill closed-cross section portion which is formed by a side sill inner and a side sill outer which are joined together and extends in the vehicle longitudinal direction. This side sill 33 is provided to extend in the vehicle longitudinal direction between a lower portion of the hinge pillar 5 and a rear-wheel arch front portion.

As shown in FIG. 1, a tunnel portion 34 is provided to protrude toward an inside of the cabin and extends in the vehicle longitudinal direction at a central part, in the vehicle width direction, of the front floor panel 15, a front cross member 35 (a so-called No. 2 cross member) and a middle cross member 36 (a so-called No. 2. 5 cross member) are provided to be spaced apart from each other in the vehicle longitudinal direction between the tunnel portion 34 and the side sill 33, and a closed-cross section portion extending in the vehicle width direction is formed between each of the cross embers 35, 36 and the front floor panel 15.

Meanwhile, as shown in FIGS. 1 and 8, a roof panel 39 is provided between a front header 37 positioned at a vehicle front part and a rear header 38 (specifically, a rear header panel) positioned at a vehicle rear part, and a pair of roof side rails 40, 40 extending in the vehicle longitudinal direction are provided below right-and-left both sides of the roof panel 39.

The front header 37 positioned at the vehicle front part interconnects respective front end portions of the right-and-left roof side rails 40, 40 in the vehicle width direction, and adhesively fixed to a lower face of a front portion of the roof panel 39 such that a closed-cross section portion is formed between the roof panel 39 and the front header 37.

The rear header 38 positioned at the vehicle rear part comprises, as shown in FIG. 8, an upper piece portion 38a, a front piece portion 38b which extends downwardly from a rear end of the upper piece portion 38a, a lower piece portion 38c which extends rearwardly from a lower end of the front piece portion 38b, and a rear piece portion 38d which extends upwardly from a rear end of the lower piece portion 38c, which are integrally formed by bending. Rear header reinforcements 41F, 41R are connected to an upper part of the rear header 38, and a rear end portion of the roof panel 39 is adhesively fixed to the rear header 38.

The rear end portion of the roof panel 39 comprises, as shown in FIG. 8, a front piece portion 39b which extends downwardly from a rear end of a roof panel body 39a, a horizontal portion 39c which extends rearwardly from a lower end of the front piece portion 39b, a vertical wall portion 39d which extends downwardly from a rear end of the horizontal portion 39c, a lower piece portion 39e which extends rearwardly from a lower end of the vertical wall portion 39d, and a rear piece portion 39f which extends upwardly from a rear end of the lower piece portion 39e, which are integrally formed by bending.

The upper piece portion 38a of the rear header 38 is adhesively fixed to the roof panel body 39a of the roof panel 39, and the rear piece portion 38d of the rear header 38 is adhesively fixed to the rear piece portion 39f of the roof panel 39. A rear-header closed-cross section portion 42 extending in the vehicle width direction is formed between the rear header 38 and the rear header reinforcement 41F.

As shown in FIG. 1, the roof side rail 40 has a roof-side closed-cross section portion extending in the vehicle longitudinal direction which is formed by a roof side rail outer and a roof side rail inner which are fixedly joined together, and this roof side rail 41 is configured to be divided into plural parts in the vehicle longitudinal direction in the present embodiment. In FIGS. 4 and 5, a middle reinforcement 43 and a rear reinforcement 44 of the roof side rail 40 are shown. As shown in FIG. 1, plural roof reinforcements 45, 46, 47 are provided to be space apart from each other in the vehicle longitudinal direction between the front header 37 positioned at the vehicle front part and the rear header 38 positioned at the vehicle rear part.

Each of these roof reinforcements 45-47 is a reinforcing member which extends in the vehicle width direction between the right-and-left roof side rails 40, 40, and is adhesively fixed to a lower surface of the roof panel 39 such that a roof-reinforcement closed-cross section portion is formed between the roof panel 39 and each of the roof reinforcements 45-47.

The rearmost roof reinforcement 47 is configured to have an inverse-hat shaped cross section as shown in FIG. 8, and a roof-reinforcement closed-cross sections 48 extending in the vehicle width direction is formed between the roof reinforcement 47 and the roof panel 39.

As shown in FIG. 1, an upper end portion of the hinge pillar 5 and a front end portion of the roof side rail 40 are interconnected by a front pillar 50 (a so-called A pillar) which extends obliquely upwardly-and-rearwardly from the hinge pillar 5. The front pillar 50 is formed by a front pillar inner and a front pillar outer which are fixedly joined together such that a front-pillar closed-cross section portion extending in a longitudinal direction of the front pillar 50 is formed therebetween.

Further, as shown in FIG. 1, a lower face portion of a middle portion, in the longitudinal direction, of the roof side rail 40 and an upper face portion of a middle portion, in the longitudinal direction, of the side sill 33 are interconnected by a center pillar 51 (a so-called B pillar). The center pillar 51 is formed by a center pillar inner and a center pillar outer which are fixedly joined together such that a center-pillar closed-cross section portion extending in the vertical direction is formed therebetween. Moreover, as shown in FIGS. 1, 4 and 5, a rear portion of the roof side rail 40 and a rear portion of the side sill 33 are interconnected by a middle pillar 52 (a so-called C pillar) extending substantially in the vehicle vertical direction (herein, a specific structure of the middle pillar 52 will be described later).

As shown in FIG. 1, a space which is enclosed by the hinge pillar 5, the front pillar 50, the roof side rail 40, the center pillar 51, and the side sill 33 is formed at a front-door opening 53, and a space which is enclosed by the center pillar 51, the roof side rail 4, the middle pillar 52, and the side sill 33 is formed at a rear-door opening 54. The above-described middle pillar 52 is arranged along a rear-side opening edge of the rear-door opening 54.

As shown in FIG. 7 which is the sectional view of the major part taken along line B-B of FIG. 2, a rear bumper reinforcement 56 is attached to a rear end portion of the rear side frame 32 via a downward extension portion 21a which extends downwardly from a portion forming the rear-end closed-cross section portion 22 of the rear end cross member 21, a downward extension portion 20a which extends downwardly from a portion forming the rear-end closed-cross section portion 22 of the rear end panel 20, and a set plate 55. A rear bumper beam 57 is provided to extend between the pair of right-and-left rear bumper reinforcements 56.

The rear bumper beam 57 comprises a rear bumper beam body 57a and a closing plate 57b which closes an opening side of the rear bumper beam body 57a such that a rear-bumper closed-cross section portion 57c extending in the vehicle width direction is formed therebetween. As shown in FIG. 7, a rear end reinforcement 58 is provided between the rear end cross member 21 and the rear end panel 20 which form the rear-end closed-cross section portion 22.

As shown in FIGS. 4 and 10 which is the sectional view taken along line E-E of FIG. 3, a rear-end side-portion panel 59, a rear-end side-portion reinforcement 60, and a rear-end side-portion cross member 61 are respectively provided at a side-end upper portion of the rear end panel 20, a side-end upper portion of the rear end reinforcement 58, and a side-end upper portion of the rear end cross member 21 integrally or so as to be integrally continuous thereto, whereby a rear end pillar 62 is formed by these three members and a closed-cross section portion 63 which is continuous to the rear-end closed-cross section portion 22 is formed between the rear-end side-portion reinforcement 60 and the rear-end side-portion cross member 61.

As shown in FIGS. 3, 4 and 5, a side portion, in the vehicle width direction, of the rear header 38 and the rear end pillar 62 are interconnected by a rear pillar 64 (a so-called D pillar) of a closed-cross section structure. A rear baggage-room opening 65 is formed by the rear header 38, the rear pillar 64, the rear end pillar 62, the rear end cross member 21, and the rear end panel 20 (see FIG. 4).

As shown in FIG. 9, the rear pillar 64 is formed by a rear pillar inner 66, a rear pillar outer 67, and a rear pillar reinforcement 68 which are fixedly joined together, and a rear-pillar closed-cross section portion 69 which is continuous to the closed-cross section portion 63 shown in FIG. 10 is formed between the rear pillar reinforcement 68 and the rear pillar inner 66. As shown in FIG. 10, a rear wheel house 72 is formed by a rear wheel house outer 70 forming a side panel and a rear wheel house inner 71.

As shown in FIGS. 10 and 3, a side panel inner lower 73 is provided to be upwardly continuous from the rear wheel house outer 70, and a side panel inner upper 74 is upwardly connected to the rear wheel house outer 70, wherein a side panel 75 is formed by the side panel inner lower 73 and the side panel inner upper 74. As shown in FIG. 9, a rear upper portion of the side panel inner upper 74 is connected to an outward-end bent portion 64a, in the vehicle width direction, of the rear pillar 64.

As shown in FIG. 11, a damper support section 76 for a rear suspension is provided at the rear side frame 32. As shown in the same figure, the damper support section 76 is a portion to support an upper end portion of a rear suspension damper 78 with a damper spring, this damper support section 76 is of an oval cylindrical shape and provided with a top plate portion (a so-called top deck portion). As shown by a dotted line in FIG. 3, the damper support section 76 is provided at the rear side frame 32 between the cross member upper 23, the cross member lower 25 and the rear cross member 27.

As shown in FIGS. 11 and 12, The rear side frame lower 30 of the rear side frame 32 is configured such that it is branched into an outside part 30A and an inside part 30B at a position located in back of an arrangement position of the damper support section 76 and then these parts 30A, 30B converge at a position located in front of the arrangement position of the damper support section 76. As shown in FIG. 11, a skirt portion 76a of the damper support section 76 which is positioned on an outward side in the vehicle width direction is fixed to an inward-side portion, in the vehicle width direction, of the outside part 30A and a skirt portion 76b of the damper support section 76 which is positioned on an inward side in the vehicle width direction is fixed to an outward-side portion, in the vehicle width direction, of the inside part 30B.

As shown in FIG. 11, an outward-side flange portion 29a, in the vehicle width direction, of the rear side frame upper 29 of the rear side frame 32 is fixedly joined to the outer panel 79 positioned below the rear wheel house inner 71, and an outward-side portion 30c, in the vehicle width direction, of the outside part 30A of the rear side frame lower 30 is fixedly joined to a lower portion of the outer panel 79.

Herein, as shown in FIGS. 3, 4 and 5, the above-described middle pillar 52 (the so-called C pillar) has a closed-cross section portion extending in the longitudinal direction thereof which is formed by a middle pillar inner 52a (see FIG. 3) and middle-pillar reinforcements, which will be below. A middle-pillar upper reinforcement 52b, a middle-pillar middle reinforcement 52c, and a middle-pillar lower reinforcement 52d are fixedly joined to an outward-side face, in the vehicle width direction, of the middle pillar inner 52a.

As shown in FIGS. 4 and 5, the middle-pillar upper reinforcement 52b is positioned between a rear-side upper opening edge of the rear-door opening 54 and a front edge of an opening portion 82 for a quarter window, the middle-pillar middle reinforcement 52c is fixedly joined to the side panel inner upper 74, the side panel inner lower 73, and a front upper portion of the rear wheel house outer 70, and the middle-pillar lower reinforcement 52d is fixedly joined to a front edge portion of the rear wheel house outer 70.

As shown in FIGS. 9 and 10, a closed-cross section portion 81 extending in the longitudinal direction of the middle pillar 52 is formed between the middle pillar inner 52a and the middle-pillar reinforcement 52e which is formed by the middle-pillar upper reinforcement 52b, the middle-pillar middle reinforcement 52c, and the middle-pillar lower reinforcement 52d.

As shown in FIGS. 9 and 10, a whole part of the rear vehicle body which extends from the rear-end side-portion panel 59 and an outer edge portion of the rear pillar outer 67 to a lower edge portion of the rear wheel house outer 70 and a front edge portion of the middle pillar 52, excluding an opening portion 80 for the quarter window, is covered with a side frame outer 82 as a vehicle-body outer plate, illustration of which is omitted in FIGS. 4 and 5. As shown in FIGS. 2 and 3, there is provided a first brace member 83 which connects a lower portion of a portion of the middle pillar 52 where the middle-pillar upper reinforcement 52b is provided and an upper portion of the cross member upper 23 in the vertical direction along a rear edge of the rear-door opening 54.

The first brace member 83 is, as shown in FIG. 10, configured to have a nearly hat-shaped cross section perpendicular to its longitudinal direction, and joint flanges of which are positioned at its forward side, rearward side, and upper side are fixedly joined to the rear wheel house inner 71 and the side panel inner upper 74, whereby a closed-cross section portion 84 (see FIG. 10) extending in the vertical direction is formed between the first brace member 83 and the above-described members 71, 74. The first brace member 83 is provided on the forward side, in the vehicle longitudinal direction, of the damper support section 76. A second brace member 85 is provided on the rearward side, in the vehicle longitudinal direction, of the damper support section 76 such that this member 85 connects an upper end of the rear pillar 64 and the rear side fame 32 in the vertical direction.

The second brace member 85 is, as shown in FIGS. 9 and 10, configured to have a hat-shaped cross section perpendicular to its longitudinal direction, and joint flanges of which are positioned at its forward-and-rearward both sides are fixedly joined to the rear wheel house inner 71 and the side panel inner upper 74, whereby a closed-cross section portion 82 extending in the vertical direction is formed between the second brace member 85 and the above-described members 71, 74.

Meanwhile, as shown in FIGS. 2, 3, 4 and 11, a damper-support reinforcing member 87 for the rear suspension is fixed to a floor portion of an upper face of the rear side frame 32, specifically fixed to an upper face portion of the rear side frame upper 29. This reinforcing member 87 is made of aluminum die-casting.

Particularly, as shown in FIG. 4, the damper-support reinforcing member 87 comprises a first reinforcement portion 87a which is positioned at its front portion and integrally reinforces a lower portion of the first brace member 83 and an end portion, in the vehicle width direction, of the cross member upper 23, a second reinforcement portion 87b which is positioned at its rear portion and reinforces a lower portion of the second brace member 85, an outside wall portion 87c which connects, in the vehicle longitudinal direction, the first reinforcement portion 87a and the second reinforcement portion 87b, and a lower wall portion 87e which extends obliquely downwardly from the upper wall portion 87d along the shapes of the upper wall portion 87d and the rear side frame upper 29, which are formed integrally. This member 87 is fixed to a corresponding position of the vehicle body by an attaching member, such as bolts and nuts or rivets.

Further, as shown in FIGS. 2 and 7, the rear side frame 32 and the downward extension portion 21a of the rear end cross member 21 are interconnected via a rear-bumper bracket upper 88 and a rear-bumper bracket lower 89 as a rear-bumper-reinforcement attachment reinforcing member.

Particularly, as shown in FIGS. 2 and 7, the rear-bumper bracket upper 88 comprises a rear wall portion 88a which is provided to rise upwardly and fixedly fastened to the downward extension portion 21a of the rear end cross member 21, the downward extension portion 20a of the rear end panel 20, and the set plate 55 by using a fastening member, such as bolts and nuts, and a hat-shaped portion 88b which extends along a shape of a rear end of the rear side frame upper 29, which are formed integrally. Herein, the hat-shaped portion 88b is fixedly joined to the rear side frame upper 29, and the rear wall portion 88a is fixedly fastened to the above-described respective members 21, 20, 55. In FIG. 2, reference character 90 denotes a V-shaped brace for reinforcing the rear seat pan 18 (a brace member having a V shape in the plan view), reference character 91 denotes a rear side panel, and reference character 92 denotes a floor side panel.

Hereafter, the loop-shaped structure sections (so-called loop-shaped vehicle-body frameworks) will be described referring to FIG. 13 and others. Each of the loop-shaped structure sections is formed by the closed-cross section portion where the closed-cross section is partitioned by plural members and/or the thick plate portion having the thicker plate thickness. As shown in FIG. 13, there is provided a first loop-shaped structure section Z1 which is provided on the forward side, in the vehicle longitudinal direction, of and closely to the damper support section 76 (see FIG. 11) and to extend continuously along a vehicle-body lower wall part H extending in the vehicle width direction, vehicle-body right-and-left both side wall parts I extending in the vehicle vertical direction, and a vehicle-body upper wall part J extending in the vehicle width direction at a vehicle-body upper part so as to have the loop shape in the vehicle elevational view.

The above-described first loop-shaped structure section Z1 comprises the vehicle-body lower wall part H of the closed-cross section portion 24 (see FIG. 6) extending in the vehicle width direction which is formed by the rear floor pan 19 and the cross member upper 23 and the cross member lower 25 which are joined to the rear floor pan 19, each of the vehicle-body side wall parts I of the closed-cross section portions 84, 81 (see FIGS. 9 and 10) extending in the vehicle vertical direction which are formed by the rear wheel house 72 and the first brace member 83 and the middle pillar 52 which are joined to the rear wheel house 72, and the vehicle-body upper wall part J of the closed-cross section portion 48 (see FIG. 8) extending in the vehicle width direction which is formed by the roof panel 39 and the roof reinforcement 47 joined to the roof panel 39.

Further, as shown in FIGS. 4 and 13, there is provided a second loop-shaped structure section Z2 which is provided to extend continuously along a lower wall part K extending in the vehicle width direction, right-and-left both side wall parts L extending in the vehicle vertical direction, and an upper wall part M extending in the vehicle vertical direction of the vehicle body which are provided around the rear baggage-room opening 65 as a rear-gate opening portion so as to have a loop shape in the vehicle elevational view.

The second loop-shaped structure section Z2 comprises the vehicle-body lower wall part K of the closed-cross section portion 22 (see FIG. 6) extending in the vehicle width direction which is formed by the rear end panel 20 and the rear end cross member 21 joined to the rear end panel 20, each of the vehicle-body side wall parts L of the closed-cross section portions 69, 63 (see FIGS. 9 and 10) extending in the vehicle vertical direction which are formed by the rear pillar 64 and the rear end pillar 62, and the vehicle-body upper wall part M of the closed-cross section portion 42 (see FIG. 8) extending in the vehicle width direction which is formed by the roof panel 39 and the rear header 38 joined to the roof panel 39.

Further, as shown in FIG. 13, there is provided a third loop-shaped structure section Z3 which is provided to extend continuously along a lower side wall part S of the vehicle body which interconnects respective end portions of the lower wall parts H, K of the first and second loop-shaped structure sections Z1, Z2, the side wall part I of the first loop-shaped structure section Z1, an upper side wall part T of the vehicle body which interconnects respective upper end portions of the upper wall parts J, M of the first and second loop-shaped structure sections Z1, Z2, and the side wall part L of the second loop-shaped structure section Z2 so as to have a loop shape in a vehicle side view.

Herein, the third loop-shaped structure section Z3 comprises the vehicle-body lower wall part S of the closed-cross section portion 31 (see FIG. 11) extending in the vehicle longitudinal direction which is formed by the rear side frame 32, the vehicle-body side wall part I (which is common to the side wall part I of the first loop-shaped structure section Z1) of the closed-cross section portions 84, 81 extending in the vehicle vertical direction which are formed by the rear wheel house 72 and the first brace member 83 and the middle pillar 52 which are joined to the rear wheel house 72, the vehicle-body upper wall part T of the closed-cross section portion extending in the vehicle longitudinal direction which is formed by the roof side rail 40, and the vehicle-body side wall part L (which is common to the side wall part L of the second loop-shaped structure section Z2) of the closed-cross section portion 69 extending in the vehicle vertical direction which is formed by the rear pillar 64 (see FIGS. 9, 10 and 13).

As described above, the first loop-shaped structure section Z1 positioned on the forward side, in the vehicle longitudinal direction, of and closely to the damper support section 76 for the rear suspension (see FIG. 11) and the second loop-shaped structure section Z2 provided around the rear baggage-room opening 65 are connected by the third loop-shaped structure section Z3 configured to have the loop shape in the vehicle side view, whereby the vehicle-body rigidity of the vehicle rear portion is securely improved.

There is further provided a fourth loop-shaped structure section Z4 which is positioned on the rearward side, in the vehicle longitudinal direction, and closely to the damper support section 76 for the rear suspension (see FIG. 11) and provided to extend continuously along a lower wall part N, right-and-left both side wall parts P, and an upper wall part M of the vehicle body so as to have a loop shape in the vehicle elevational view. The upper wall part M of the fourth loop-shaped structure section Z4 is common to the upper wall part M of the above-described second loop-shaped structure section Z2.

The above-described fourth loop-shaped structure section Z4 comprises the vehicle-body lower wall part N of the closed-cross section portion 28 (see FIG. 6) extending in the vehicle width direction which is formed by the rear floor pan 19 and the rear cross member 27 (see FIG. 6) as a second floor cross member joined to the rear floor pan 19, each of the vehicle-body side wall parts P of the closed-cross section portion 86 (see FIGS. 9 and 10) extending in the vehicle vertical direction which is formed by the rear wheel house 72 and the side panel 75 and the second brace member 85 which is joined to the rear wheel house 72 and the side panel 75, and the vehicle-body upper wall part M of the closed-cross section portion 42 (see FIG. 8) extending in the vehicle width direction which is formed by the roof panel 39 and the rear header 38 joined to the roof panel 39.

That is, the first loop-shaped structure section Z1 and the fourth loop-shaped structure section Z4 which are respectively formed in the loop shape in the vehicle elevational view are configured to be independent (separated) from each other without partially overlapping each other. Thus, the first loop-shaped structure section Z1 and the fourth loop-shaped structure section Z4 are respectively positioned on the forward side of and closely to the damper support section 76 for the rear suspension and on the rearward side of and closely to the damper support section 76 for the rear suspension, whereby the vehicle-body rigidity of the vehicle rear portion is securely improved.

Herein, the respective upper ends of the first and second loop-shaped structure sections Z1, Z2 are interconnected via the roof side rail 40 in the vehicle longitudinal direction, and the respective lower ends of the first and second loop-shaped structure sections Z1, Z2 are interconnected via the closed-cross section portion 31 (see FIG. 11) including the rear side frame 32 and the rear-bumper bracket upper 88 as a rear-bumper-reinforcement attachment reinforcing member connecting the rear end of the rear side frame 32 and the vehicle-body lower wall part K of the second loop-shaped structure section Z2. Thus, the rear end of the rear side frame 40 and the vehicle-body lower wall part K of the second loop-shaped structure section Z2 are connected by the rear-bumper bracket upper 88, whereby the rigidity of the rear baggage-room opening 65 is further improved. Further, a part of the third loop-shaped structure section Z3 is reinforced by the rear-bumper bracket upper 88. Moreover, the respective upper ends or the respective lower ends of the first and second loop-shaped structure sections Z1, Z2 are connected by using the roof side rail 40 or the rear side frame 32 which are generally provided at the vehicle body.

As shown in FIGS. 3 and 11, the damper support section 76 for the rear suspension is provided at the rear side frame 32, and the damper-support reinforcing member 87 for the rear suspension to reinforce the damper support section 76 is joined to the floor portion of the upper surface of the rear side frame 32, specifically to the upper face portion of the rear side frame upper 29, by using the fastening member, such as bolts and nuts or rivets.

If the damper support section is provided at the upper part of the wheel house which is upwardly-and-outwardly, in the vehicle width direction, offset from the rear side frame, when a load is inputted in a vehicle rear collision or in a vehicle side collision, there occurs some moment acting on the damper support section. However, by providing the damper support section 76 at the rear side frame 32 itself as shown in FIGS. 3 and 11, it is suppressed that the above-described moment occurs, whereby the collision-load inputting is minimized.

Moreover, as shown in FIG. 13, the respective lower ends of the first and fourth loop-shaped structure sections Z1, Z4 are interconnected in the vehicle longitudinal direction via the damper-support reinforcing member 87 for the rear suspension. Thereby, the lower portion of the first loop-shaped structure section Z1 and the lower portion of the fourth loop-shaped structure section Z4 are connected by using the damper-support reinforcing member 87 for the rear suspension, and also, as apparent from FIG. 13, a part of the vehicle body positioned between the lower portion of the first loop-shaped structure section Z1 and the lower portion of the fourth loop-shaped structure section Z4 is reinforced by this damper-support reinforcing member 87, so that the vehicle-body rigidity of the vehicle rear portion is further securely improved.

Meanwhile, there are further provided the damper support section 14 for the front suspension provided at the upper part of the front wheel house 12 as shown in FIG. 1, the fifth loop-shaped structure section Z5 provided in the vicinity of the damper support section 14 for the front suspension so as to have a loop shape in the vehicle elevational view, and the sixth loop-shaped structure section Z6 provided around the front-door opening 53 and the rear-door opening 54 so as to have a loop shape in the vehicle side view, wherein the first loop-shaped structure section Z1 and the sixth loop-shaped structure section Z6 are connected via the middle pillar 52.

As shown in FIG. 1, the fifth loop-shaped structure section Z5 is formed by the suspension tower portion 13 of the thick plate portion and its top deck portion 13a, the tower portion 8b of the closed-cross section structure which is connected to the front side frame 7, the sub frame body 8a extending in the vehicle width direction, and the closed-cross section extending in the vehicle width direction which is formed by the cowl cross member upper 3 and the cowl cross member lower, not illustrated.

Further, as shown in FIG. 1, the sixth loop-shaped structure section Z6 is formed by the hinge pillar 5 of the closed-cross section structure extending in the vertical direction, the front pillar 50 of the closed-cross section structure extending obliquely upwardly-and-rearwardly, the roof side rail 40 of the closed-cross section structure extending in the vehicle longitudinal direction at the vehicle-body upper part, the middle pillar 52 of the closed-cross section structure, and the side sill 33 of the closed-cross section structure extending in the vehicle longitudinal direction at the vehicle-body lower part.

As shown in FIG. 13, the rear portion of the sixth loop-shaped structure section Z6 is connected to the third loop-shaped structure section Z3 via the roof side rail 40 at its upper portion and connected to the third loop-shaped structure section Z3 via the rear side frame 32 at its lower portion, whereby the torsional rigidity of a whole part of the vehicle body is so improved that the vehicle's handling stability is secured.

Moreover, the rigidity of the vehicle-body upper part is improved over a range from the front pillar 50 to the rear pillar 64, and the rigidity of the vehicle-body lower part is improved over a range from the hinge 5 to the rear end panel 20, the rear end cross member 21.

Herein, in the figures, an arrow F shows a vehicle front (forward) side, an arrow R shows a vehicle rear (rearward) side, an arrow IN shows the inward side in the vehicle width direction, an arrow OUT shows the outward side in the vehicle width direction, and an arrow UP shows a vehicle upward side.

As described above, the rear vehicle-body structure of the vehicle according to the present embodiment comprises the damper support section 76 for the rear suspension provided at the upper part of the rear wheel house 72, the first loop-shaped structure section Z1 provided to extend continuously along the lower wall part H, the right-and-left both side wall parts I, and the upper wall part J of the vehicle body so as to have the loop shape in the vehicle elevational view, the first loop-shaped structure section Z1 being positioned on the forward side, in the vehicle longitudinal direction, of the damper support section 76 and closely to the damper support section 76, the second loop-shaped structure section Z2 provided to extend continuously along the lower wall part K, the right-and-left both side wall parts L, and the upper wall part M of the vehicle body which are provided around the rear-gate opening portion (the rear baggage-room opening 65) so as to have the loop shape in the vehicle elevational view, and the third loop-shaped structure section Z3 provided to extend continuously along the lower side wall part S of the vehicle body which interconnects the respective end portions of the lower wall parts H, K of the first and second loop-shaped structure sections Z1, Z2, one of the right-and-left both side wall parts I of the first loop-shaped structure section Z1, the upper side wall part T of the vehicle body which interconnects the respective upper end portions of the upper wall parts J, M of the first and second loop-shaped structure sections Z1, Z2, and one of the right-and-left both side wall parts L of the second loop-shaped structure section Z2 so as to have the loop shape in the vehicle side view, wherein each of the first, second, and third loop-shaped structure sections Z1, Z2, Z3 is formed by the closed-cross section portion where the closed-cross section is partitioned by the plural members and/or the thick plate portion having the thicker plate thickness than the vehicle-body panel (see FIGS. 11 and 13).

According to this structure, since the first loop-shaped structure section Z1 positioned on the forward side, in the vehicle longitudinal direction, of and closely to the damper support section 76 for the rear suspension and the second loop-shaped structure section Z2 provided around the rear-gate opening portion (the rear baggage-room opening 65) are connected by the third loop-shaped structure section Z3 configured to have the loop shape in the vehicle side view, the vehicle-body rigidity of the vehicle rear portion can be securely improved.

Further, in the present embodiment, the first loop-shaped structure section Z1 comprises the vehicle-body lower wall part H of the closed-cross section portion 24 extending in the vehicle width direction which is formed by the floor panel (the rear floor pan 19) and the floor cross member (the cross member upper 23, the cross member lower 25) joined to this floor panel, each of the vehicle-body side wall parts I of the closed-cross section portions 84, 81 extending in the vehicle vertical direction which are formed by the rear wheel house 72 and the first brace member 83 and the middle pillar which are joined to the rear wheel house 72, and the vehicle-body upper wall part J of the closed-cross section portion 48 extending in the vehicle width direction which is formed by the roof panel 39 and the roof reinforcement 47 joined to the roof panel 39 (see FIGS. 6, 8, 9 and 10).

According to this structure, the first loop-shaped structure section Z1 can be formed without using any particularly-large special members additionally.

Moreover, in the present embodiment, the second loop-shaped structure section Z2 comprises the vehicle-body lower wall part K of the closed-cross section portion 22 extending in the vehicle width direction which is formed by the rear end panel 20 and the rear end cross member 21 joined to the rear end panel 20, each of the vehicle-body side wall parts L of the closed-cross section portions 69, 63 extending in the vehicle vertical direction which are formed by the rear pillar 64 and the rear end pillar 62, and the vehicle-body upper wall part M of the closed-cross section portion 42 extending in the vehicle width direction which is formed by the roof panel 39 and the rear header 38 joined to the roof panel 39 (see FIGS. 6, 8 and 9). According to this stricture, the second loop-shaped structure section Z2 can be formed without using any particularly-large special members additionally.

Also, in the present embodiment, the third loop-shaped structure section Z3 comprises the vehicle-body lower wall part S of the closed-cross section portion 31 extending in the vehicle longitudinal direction which is formed by the rear side frame 32, the vehicle-body side wall part I (which is common to the side wall part I of the first loop-shaped structure section Z1) of the closed-cross section portions 84, 81 extending in the vehicle vertical direction which are formed by the rear wheel house 72 and the first brace member 83 and the middle pillar 52 which are joined to the rear wheel house 72, the vehicle-body upper wall part T of the closed-cross section portion extending in the vehicle longitudinal direction which is formed by the roof side rail 40, and the vehicle-body side wall part L (which is common to the side wall part L of the second loop-shaped structure section Z2) of the closed-cross section portion 69 extending in the vehicle vertical direction which is formed by the rear pillar 64 (see FIGS. 9, 10 and 13).

According to this structure, the third loop-shaped structure section Z3 can be formed without using any particularly-large special members additionally.

In the present embodiment, there is further provided the fourth loop-shaped structure section Z4 provided to extend continuously along the lower wall part N, the right-and-left both side wall parts P, and the upper wall part M of the vehicle body so as to have the loop shape in the vehicle elevational view, the fourth loop-shaped structure section Z4 being positioned on the rearward side, in the vehicle longitudinal direction, of the damper support section 76 for the rear suspension and closely to the damper support section 76, wherein the fourth loop-shaped structure section Z4 comprises the vehicle-body lower wall part N extending in the vehicle width direction which is formed by the floor panel (the rear floor pan 19) and the second floor cross member (the rear cross member 27) joined to this floor panel, each of the vehicle-body side wall parts P extending in the vehicle vertical direction which is formed by the rear wheel house 72 and the side panel 75 and the second brace member 85 which is joined to the rear wheel house 72 and the side panel 75, and the vehicle-body upper wall part M extending in the vehicle width direction which is formed by the roof panel 39 and the rear header 38 joined to the roof panel 39, and the fourth loop-shaped structure section Z4 is formed by the closed-cross section portion where the closed-cross section is partitioned by the plural members and/or the thick plate portion having the thicker plate thickness than the vehicle-body panel (see FIGS. 6, 8, 9, 10, 11 and 13).

According to this structure, since the first loop-shaped structure section Z1 and the fourth loop-shaped structure section Z4 are respectively positioned on the forward side of and closely to the damper support section 76 for the rear suspension and on the rearward side of and closely to the damper support section 76 for the rear suspension, the vehicle-body rigidity of the vehicle rear portion can be securely improved.

Additionally, in the present embodiment, the respective upper ends of the first and second loop-shaped structure sections Z1, Z2 are interconnected via the roof side rail 40 in the vehicle longitudinal direction, and the respective lower ends of the first and second loop-shaped structure sections Z1, Z2 are interconnected via the closed-cross section portion 31 including the rear side frame 32 and the rear-bumper-reinforcement attachment reinforcing member (the rear-bumper bracket upper 88) connecting the rear end of the rear side frame 32 and the vehicle-body lower wall part K of the second loop-shaped structure section Z2 (see FIGS. 7, 11 and 13).

According to this structure, since the rear end of the rear side frame 32 and the vehicle-body lower wall part K of the second loop-shaped structure section Z2 are connected by the rear-bumper-reinforcement attachment reinforcing member (the rear-bumper bracket upper 88), the rigidity of the rear-gate opening portion (the rear baggage-room opening 65) can be further improved. Further, a part of the third loop-shaped structure section Z3 can be reinforced by the rear-bumper-reinforcement attachment reinforcing member (the rear-bumper bracket upper 88). Moreover, the respective upper ends or the respective lower ends of the first and second loop-shaped structure sections Z1, Z2 are connected by using the roof side rail 40 or the rear side frame 32 which are generally provided at the vehicle body.

In the present embodiment, the damper support section 76 for the rear suspension is provided at the rear side frame 32, and the damper-support reinforcing member 87 for the rear suspension to reinforce the damper support section 76 is joined to the floor portion of the upper surface of the rear side frame 32 (see FIGS. 3 and 11)

According to this structure, there is the following effect. That is, if the damper support section is provided at the upper part of the wheel house which is upwardly-and-outwardly, in the vehicle width direction, offset from the rear side frame, when a load is inputted in a vehicle rear collision or in a vehicle side collision, there occurs some moment acting on the damper support section. However, since the damper support section 76 is provided at the rear side frame 32 itself in this structure, it is suppressed that the above-described moment occurs, so that the collision-load inputting can be minimized.

Moreover, in the present embodiment, the respective lower ends of the first and fourth loop-shaped structure sections Z1, Z4 are interconnected in the vehicle longitudinal direction via the damper-support reinforcing member 87 for the rear suspension (see FIG. 13).

According to this structure, the lower portion of the first loop-shaped structure section Z1 and the lower portion of the fourth loop-shaped structure section Z4 are connected by using the damper-support reinforcing member 87 for the rear suspension, and also a part of the vehicle body positioned between the lower portion of the first loop-shaped structure section Z1 and the lower portion of the fourth loop-shaped structure section Z4 can be reinforced by this damper-support reinforcing member 87. Accordingly, the vehicle-body rigidity of the vehicle rear portion can be further securely improved.

Also, in the present embodiment, there are further provided the damper support section 14 for the front suspension provided at the upper part of the front wheel house 12, the fifth loop-shaped structure section Z5 provided in the vicinity of the damper support section 14 for the front suspension so as to have the loop shape in the vehicle elevational view, the fifth loop-shaped structure section Z5 being formed by the closed-cross sections including the front-suspension tower portion (the suspension tower portion 13), the sub frame (the front sub frame 8), and the cowl cross member (the cowl cross member upper 3 and the cowl cross member lower), and the sixth loop-shaped structure section Z6 provided around the door opening portions 53, 54 so as to have the loop shape in the vehicle side view, the sixth loop-shaped structure section Z6 being formed by the closed-cross sections provided around the door opening portions 53, 54, wherein the rear portion of the sixth loop-shaped structure section Z6 is connected to the third loop-shaped structure section Z3 via the roof side rail 40 at its upper portion and connected to the third loop-shaped structure section Z3 via the rear side frame 32 at its lower portion (see FIGS. 1 and 13).

According to this structure, since the rear portion of the sixth loop-shaped structure section Z6 is connected to the third loop-shaped structure section Z3 via the roof side rail 40 and the rear side frame 32 and the fifth loop-shaped structure section Z5 is provided in the vicinity of the damper support section 14 for the front suspension, the torsional rigidity of a whole part of the vehicle body is so improved that the vehicle's handling stability can be secured.

In correspondence between the present invention and the above-described embodiment, the rear-gate opening portion of the present invention corresponds to the rear baggage-room opening 65 of the embodiment. Likewise, the floor panel corresponds to the rear floor pan 19, the floor cross member corresponds to the cross member upper 23 and the cross member lower 25, the second floor cross member corresponds to the rear cross member 27, the rear-bumper-reinforcement attachment reinforcing member corresponds to the rear-bumper bracket upper 88, the front-suspension tower portion corresponds to the suspension tower portion 13, the sub frame corresponds to the front sub frame 8, and the cowl cross member corresponds to the cowl cross member upper 3 and the cowl cross member lower. However, the present invention should not be limited to the above-described embodiment and any other modifications or improvements may be applied within the scope of a spirit of the present invention.

What is claimed is:

1. A rear vehicle-body structure of a vehicle, comprising:
a damper support section for a rear suspension provided at an upper part of a rear wheel house;
a first loop-shaped structure section provided to extend continuously along a lower wall part, right-and-left both side wall parts, and an upper wall part of a vehicle body so as to have a loop shape in a vehicle elevational view, the first loop-shaped structure section being positioned on a forward side, in a vehicle longitudinal direction, of said damper support section and closely to the damper support section;
a second loop-shaped structure section provided to extend continuously along a lower wall part, right-and-left both side wall parts, and an upper wall part of the vehicle body which are provided around a rear-gate opening portion so as to have a loop shape in the vehicle elevational view;
a third loop-shaped structure section provided to extend continuously along a lower side wall part of the vehicle body which interconnects respective end portions of the lower wall parts of said first and second loop-shaped structure sections, one of the right-and-left both side wall parts of said first loop-shaped structure section, an upper side wall part of the vehicle body which interconnects respective upper end portions of the upper wall parts of said first and second loop-shaped structure sections, and one of the right-and-left both side wall parts of said second loop-shaped structure section so as to have a loop shape in a vehicle side view; and
a fourth loop-shaped structure section provided to extend continuously along a lower wall part, right-and-left both side wall parts, and an upper wall part of the vehicle body so as to have a loop shape in a vehicle elevational view, the fourth loop-shaped structure section being positioned on a rearward side, in the vehicle longitudinal direction, of said damper support section for the rear suspension and closely to the damper support section,
wherein each of said first, second, and third loop-shaped structure sections is formed by a closed-cross section portion that is partitioned by plural members and/or a thick plate portion having a thicker plate thickness than a vehicle-body panel,
said first loop-shaped structure section comprises:
the vehicle-body lower wall part of a closed-cross section portion that extends in a vehicle width direction and is formed by a floor panel and a floor cross member joined to the floor panel,
each of vehicle-body side wall parts of closed-cross section portions that extend in a vehicle vertical direction and are formed by the rear wheel house and a first brace member and a pillar which are joined to said rear wheel house, and
a vehicle-body upper wall part of a closed-cross section portion that extends in the vehicle width direction and is formed by a roof panel and a roof reinforcement joined to the roof panel,
the first brace member connects a lower portion of a portion of a middle pillar and an upper portion of the floor cross member in the vehicle vertical direction,
said fourth loop-shaped structure section comprises the vehicle-body lower wall part extending in the vehicle width direction which is formed by the floor panel and a second floor cross member joined to the floor panel, each of the vehicle-body side wall parts extending in the vehicle vertical direction which is formed by the rear wheel house and a side panel and a second brace member which is joined to the rear wheel house and the side panel, and the vehicle-body upper wall part extending in the vehicle width direction which is formed by the roof panel and a rear header joined to the roof panel, and the fourth loop-shaped structure section is formed by a closed-cross section portion that is partitioned by plural members and/or a thick plate portion having a thicker plate thickness than the vehicle-body panel,
said damper support section for the rear suspension is provided at a rear side frame, and a damper-support reinforcing member for the rear suspension to reinforce the damper support section is joined to a floor portion of an upper surface of said rear side frame, and
respective lower ends of said first and fourth loop-shaped structure sections are interconnected in the vehicle longitudinal direction via a damper-support reinforcing member for the rear suspension.

2. The rear vehicle-body structure of the vehicle of claim 1, wherein said second loop-shaped structure section comprises the vehicle-body lower wall part of a closed-cross section portion that extends in the vehicle width direction and is formed by a rear end panel and a rear end cross member joined to the rear end panel, each of the vehicle-body side wall parts of a closed-cross section portion that extends in the vehicle vertical direction and is formed by a rear pillar, and the vehicle-body upper wall part of a closed-cross section portion that extends in the vehicle width direction and is formed by the roof panel and a rear header joined to the roof panel.

3. The rear vehicle-body structure of the vehicle of claim 1, wherein said third loop-shaped structure section comprises the vehicle-body lower wall part of a closed-cross section portion that extends in the vehicle longitudinal direction and is formed by a rear side frame, the vehicle-body side wall part of closed-cross section portions that extend in the vehicle vertical direction and are formed by the rear wheel house and a first brace member and a pillar which are joined to said rear wheel house, the vehicle-body upper wall part of a closed-cross section portion that extends in the vehicle longitudinal direction and is formed by a roof side rail, and the vehicle-body side wall part of a closed-cross section portion that extends in the vehicle vertical direction and is formed by a rear pillar.

4. The rear vehicle-body structure of the vehicle of claim 1, wherein respective upper ends of said first and second loop-shaped structure sections are interconnected via a roof side rail in the vehicle longitudinal direction, and respective lower ends of said first and second loop-shaped structure sections are interconnected via a closed-cross section portion that includes a rear side frame and a rear-bumper-reinforcement attachment reinforcing member connecting a rear end of the rear side frame and the vehicle-body lower wall part of said second loop-shaped structure section.

5. The rear vehicle-body structure of the vehicle of claim 1, further comprising:
a damper support section for a front suspension provided at an upper part of a front wheel house;
a fifth loop-shaped structure section provided in a vicinity of said damper support section for the front suspension so as to have a loop shape in the vehicle elevational view, the fifth loop-shaped structure section being formed by closed-cross sections that include a front-suspension tower portion, a sub frame, and a cowl cross member; and
a sixth loop-shaped structure section provided around a door opening portion so as to have a loop shape in a vehicle side view, the sixth loop-shaped structure section being formed by closed-cross sections that are provided around said door opening portion,
wherein a rear portion of said sixth loop-shaped structure section is connected to said third loop-shaped structure section via a roof side rail at an upper portion thereof and connected to said third loop-shaped structure section via a rear side frame at a lower portion thereof.

6. The rear vehicle-body structure of the vehicle of claim 1, wherein the first brace member connects the lower portion of the portion of the middle pillar and the upper portion of the floor cross member in the vehicle vertical direction along a rear edge of a rear-door opening.

7. The rear vehicle-body structure of the vehicle of claim 1, wherein the first brace member is configured to have a nearly hat-shaped cross section perpendicular to its longitudinal direction, and joint flanges of which are positioned at its forward side, rearward side, and upper side are fixedly joined to an inner portion of the rear wheel house and an inner upper portion of the side panel.

8. The rear vehicle-body structure of the vehicle of claim 1, wherein the first brace member is provided on the forward side, in the vehicle longitudinal direction, of the damper support section.

9. The rear vehicle-body structure of the vehicle of claim 1, wherein a damper-support reinforcing member for the rear suspension is fixed to a floor portion of an upper face of a rear side frame, and wherein a front portion of the damper-support reinforcing member integrally reinforces a lower portion of the first brace member.

10. A rear vehicle-body structure of a vehicle, comprising:
a damper support section for a rear suspension provided at an upper part of a rear wheel house;
a first loop-shaped structure section provided to extend continuously along a lower wall part, right-and-left both side wall parts, and an upper wall part of a vehicle body so as to have a loop shape in a vehicle elevational view, the first loop-shaped structure section being positioned on a forward side, in a vehicle longitudinal direction, of said damper support section and closely to the damper support section;
a second loop-shaped structure section provided to extend continuously along a lower wall part, right-and-left both side wall parts, and an upper wall part of the vehicle body which are provided around a rear-gate opening portion so as to have a loop shape in the vehicle elevational view;
a third loop-shaped structure section provided to extend continuously along a lower side wall part of the vehicle body which interconnects respective end portions of the lower wall parts of said first and second loop-shaped structure sections, one of the right-and-left both side wall parts of said first loop-shaped structure section, an upper side wall part of the vehicle body which interconnects respective upper end portions of the upper wall parts of said first and second loop-shaped structure sections, and one of the right-and-left both side wall parts of said second loop-shaped structure section so as to have a loop shape in a vehicle side view; and
a fourth loop-shaped structure section provided to extend continuously along a lower wall part, right-and-left both side wall parts, and an upper wall part of the vehicle body so as to have a loop shape in a vehicle elevational view, the fourth loop-shaped structure section being positioned on a rearward side, in the vehicle longitudinal direction, of said damper support section for the rear suspension and closely to the damper support section,
wherein each of said first, second, and third loop-shaped structure sections is formed by a closed-cross section portion that is partitioned by plural members and/or a thick plate portion having a thicker plate thickness than a vehicle-body panel,
said first loop-shaped structure section comprises:
the vehicle-body lower wall part of a closed-cross section portion that extends in a vehicle width direction and is formed by a floor panel and a floor cross member joined to the floor panel,
each of vehicle-body side wall parts of closed-cross section portions that extend in a vehicle vertical direction and are formed by the rear wheel house and a first brace member and a pillar which are joined to said rear wheel house, and
a vehicle-body upper wall part of a closed-cross section portion that extends in the vehicle width direction and is formed by a roof panel and a roof reinforcement joined to the roof panel,
the first brace member connects a lower portion of a portion of a middle pillar and an upper portion of the floor cross member in the vehicle vertical direction,
said fourth loop-shaped structure section comprises the vehicle-body lower wall part extending in the vehicle width direction which is formed by the floor panel and a second floor cross member joined to the floor panel, each of the vehicle-body side wall parts extending in the vehicle vertical direction which is formed by the rear wheel house and a side panel and a second brace member which is joined to the rear wheel house and the side panel, and the vehicle-body upper wall part extending in the vehicle width direction which is formed by the roof panel and a rear header joined to the roof panel, and the fourth loop-shaped structure section is formed by a closed-cross section portion that is partitioned by plural members and/or a thick plate portion having a thicker plate thickness than the vehicle-body panel, said damper support section for the rear suspension is provided at a rear side frame, and a damper-support reinforcing member for the rear suspension to reinforce the damper support section is joined to a floor portion of an upper surface of said rear side frame, and respective lower portions of the first loop-shaped structure section and the fourth loop-shaped structure section are connected by using the damper-support reinforcing member for the rear suspension.

* * * * *